US010524185B2

(12) United States Patent
Kay et al.

(10) Patent No.: US 10,524,185 B2
(45) Date of Patent: Dec. 31, 2019

(54) RADIO RESOURCE MANAGEMENT AND ROUTING FOR FIXED DATA CIRCUITS IN AN NGSO SATELLITE DATA COMMUNICATIONS SYSTEM

(71) Applicant: Hughes Network Systems, LLC, Germantown, MD (US)

(72) Inventors: Stanley Kay, Rockville, MD (US); Anthony Noerpel, Lovettsville, VA (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/708,051

(22) Filed: Sep. 18, 2017

(65) Prior Publication Data

US 2018/0084476 A1  Mar. 22, 2018

Related U.S. Application Data

(60) Provisional application No. 62/396,152, filed on Sep. 17, 2016.

(51) Int. Cl.
| | | |
|---|---|---|
| *H04W 40/00* | (2009.01) |
| *H04B 7/185* | (2006.01) |
| *H04W 40/02* | (2009.01) |
| *H04W 84/06* | (2009.01) |

(52) U.S. Cl.
CPC .......... *H04W 40/026* (2013.01); *H04W 84/06* (2013.01)

(58) Field of Classification Search
CPC ............................ H04W 40/026; H04W 84/06
USPC ........................................................ 455/428
See application file for complete search history.

(56) References Cited

U.S. PATENT DOCUMENTS

| | | | | |
|---|---|---|---|---|
| 5,537,679 A * | 7/1996 | Crosbie | ............... | H04B 7/18541 |
| | | | | 342/352 |
| 5,826,169 A * | 10/1998 | Natarajan | ........... | H04B 7/18558 |
| | | | | 455/13.1 |
| 6,366,761 B1 * | 4/2002 | Montpetit | ............... | H04B 7/195 |
| | | | | 370/230 |

(Continued)

OTHER PUBLICATIONS

USPTO, "International Search Report & Written Opinion", PCT/US2017/052108, dated Apr. 27, 2018.

*Primary Examiner* — Rafael Pérez-Gutiérrez
*Assistant Examiner* — Mark G. Pannell
(74) *Attorney, Agent, or Firm* — Potomac Technology Law, LLC

(57) ABSTRACT

A method for determining routes for a data circuit between source and destination terminals, where the circuit is formed via satellites traveling in respective non-geostationary orbits, and a total time during which the circuit is active is divided into time intervals. The determination of each route comprises, for each time interval, (i) selecting an uplink satellite to service the source terminal as an ingress node for the circuit, and (ii) determining a series of inter-satellite links connecting the uplink satellite to a downlink satellite servicing the destination terminal during the respective time interval, wherein the series of links is determined to be valid during the respective time interval. Each of the plurality of time intervals is of a duration based on a validity time, based on the satellites traveling in their respective orbits, for the inter-satellite link of all of the routes that is of the shortest duration.

16 Claims, 13 Drawing Sheets

(56) References Cited

U.S. PATENT DOCUMENTS

| | | | |
|---|---|---|---|
| 6,609,002 B1* | 8/2003 | Krishnamurthy | H04B 7/1856 455/12.1 |
| 6,985,454 B1* | 1/2006 | Wiedeman | H04B 7/18589 370/316 |
| 9,883,368 B2* | 1/2018 | Goossen | H04W 4/22 |
| 2002/0031103 A1* | 3/2002 | Wiedeman | H04B 7/18584 370/316 |
| 2002/0152468 A1* | 10/2002 | Parkman | H04B 7/18508 725/63 |
| 2005/0090201 A1* | 4/2005 | Lengies | H04B 7/18506 455/41.2 |
| 2007/0178833 A1* | 8/2007 | Wahlberg | H04B 7/195 455/12.1 |
| 2008/0170536 A1* | 7/2008 | Marshack | H04B 7/18521 370/316 |
| 2009/0092074 A1* | 4/2009 | Jamalipour | H04B 7/18506 370/316 |
| 2010/0039984 A1* | 2/2010 | Brownrigg | H04B 7/18584 370/316 |
| 2015/0236778 A1* | 8/2015 | Jalali | H04W 84/06 370/316 |

* cited by examiner

RADIO RESOURCE MANAGEMENT AND ROUTING FOR FIXED DATA CIRCUITS IN AN NGSO SATELLITE DATA COMMUNICATIONS SYSTEM

RELATED APPLICATIONS

This application claims the earlier filing date under 35 U.S.C. § 119(e) from U.S. provisional patent application Ser. No. 62/396,152 (filed 2016 Sep. 17), the entirety of which is incorporated herein by reference.

TECHNICAL FIELD

The present invention relates to radio resource management and data packet routing for fixed data circuits in non-geostationary orbit (NGSO) wireless data communications systems, such as low earth orbit (LEO) satellite data communications systems.

BACKGROUND

Conventional multi-beam communications satellites (e.g., spot beam satellites) and high altitude platforms (HAPs) are generally designed in a manner whereby a given geographic coverage area is serviced by a pattern of beams defined based on the geometry of the antenna elements (e.g., phased array elements) and the beam coefficients applied to the antenna. In such conventional designs, the satellite/HAP antennae generate a configuration of fixed beams radiated by the antennae, where the fixed beams are preconfigured on the satellite/HAP and sweep across the ground as the satellite/HAP moves though its orbit or flight pattern. A user terminal is thus served sequentially by the different beams as the fixed beams sweep across the geographic site or cell where the terminal is located. For example, in a typical low earth orbit (LEO) satellite system, the period of a satellite orbit is determined by the altitude of the orbit. For a satellite at about 1200 km altitude the orbital period is less than two hours. Further, in the case where the satellite employs narrow beams for high gain, the user terminal experiences a beam handover as often as every 10 to 20 seconds, where each handover requires a change in frequency and polarization on the part of the terminal, which has to be synchronized at the satellite.

Further, for example, in an non-geostationary orbit (NGSO) satellite data communications system, such as a multi-satellite LEO system, in order to provide data communications services between two ground terminals situated a relatively large geographic distance from each other, the data packets for such communications must be routed from the source satellites servicing the cell within which the source terminal is located (for the duration of the data communications) to the respective destination satellites servicing the cell within which the destination terminal is located (for the duration of the data communications). As presented below, depending on the extent of the geographic diversity of the two terminals, such data communications will require differing levels of route complexity, potentially involving a number of satellites and a number of gateways, in order for the respective data packets to traverse a wide geographic distance between the source and destination terminals. The extent of the routing complexity would depend on the number of satellites and gateways required to transmit the packets of the data communications from the source terminal to the destination terminal.

For example, assuming a relatively short distance and assuming that a single ground gateway terminal services both the source and destination satellites, the data communications may only require transferring the respective data packets from the source satellites to the destination satellites via two hops, through the ground gateway servicing the source and destination satellites, while they are servicing the respective source and destination terminals (as would be understood, in view of the transitory nature of a LEO satellite system, at different points in time a different source satellite will be servicing the source terminal and a different destination satellite will be servicing the destination terminal). Alternatively, assuming a relatively large distance between the source and destination terminals, the routing of the respective data communications packets may be required to traverse a combination of a number of satellites and a number of gateways in order to traverse such a wide geographic distance. For example, at a given point in time, the data packets may have to traverse a number of satellite-gateway-satellite hops to traverse the geographic distance. As such, in view of the transitory nature of such a system, in order to maintain a long-term or relatively permanent data communications circuit between two such terminals, the route processing overhead become significant, and also the multiple satellite-gateway hops introduce significant delay in the packet transmissions between the two terminal endpoints of the circuit.

What is needed, therefore, are approaches for efficient radio resource management and routing functions to support long-term or relatively permanent data communications circuits between two geographically diverse endpoint terminals in a non-geostationary orbit (NGSO) wireless data communications system, such as a low earth orbit (LEO) satellite system.

Some Example Embodiments

The present invention advantageously addresses the foregoing requirements and needs, as well as others, by providing a system and methods for efficient radio resource management and routing functions to support long-term or relatively permanent data communications circuits between two geographically diverse endpoint terminals in a non-geostationary orbit (NGSO) wireless data communications system, such as a low earth orbit (LEO) satellite system.

In accordance with example embodiments, a method is provided for determining a plurality of routes for a committed bit rate data communications circuit between a source ground terminal and a destination ground terminal. The circuit is formed via a plurality of satellites, each traveling in a respective non-geostationary orbit around the Earth, and a total time during which the circuit is active is divided into a plurality of time intervals of equal duration. The determination of the plurality of routes comprises (i) selecting, for each time interval, an uplink satellite of the constellation to service the source ground terminal as an ingress node for the circuit, and (ii) determining, for each time interval, a series of inter-satellite links connecting the uplink satellite selected for the respective time interval to a downlink satellite of the constellation servicing the destination ground terminal during the respective time interval, wherein the series of inter-satellite links is determined so that it will be valid for connection of the circuit between the uplink ground terminal and the downlink ground terminal during the respective time interval. the duration of each interval of the plurality of time intervals is based on a time of validity, based on the traveling of the plurality of satellites in their respective orbits, for a one of the inter-satellite links of all of the plurality of routes that is of the shortest duration.

In accordance with further example embodiments, a system for providing one or more committed bit rate data communications circuits, each between a respective source ground terminal and a respective destination ground terminal is provided. Each circuit is formed via a plurality of satellites, each traveling in a respective non-geostationary orbit around the Earth, and a total time during which the circuit is active is divided into a plurality of time intervals of equal duration. The determination of the plurality of routes comprises (i) selecting, for each time interval, an uplink satellite of the constellation to service the source ground terminal as an ingress node for the circuit, and (ii) determining, for each time interval, a series of inter-satellite links connecting the uplink satellite selected for the respective time interval to a downlink satellite of the constellation servicing the destination ground terminal during the respective time interval, wherein the series of inter-satellite links is determined so that it will be valid for connection of the circuit between the uplink ground terminal and the downlink ground terminal during the respective time interval. the duration of each interval of the plurality of time intervals is based on a time of validity, based on the traveling of the plurality of satellites in their respective orbits, for a one of the inter-satellite links of all of the plurality of routes that is of the shortest duration.

According to further example embodiments, the antennae of each satellite may be configured to form communications beams to illuminate a fixed/stationary pattern of cells on the ground as the satellite travels through its orbit. According to one such embodiment, the satellite is configured to generate rapidly time varying beams, with different scan angles, beam shapes and directivities, in order to illuminate the respective fixed/stationary ground-based cell pattern. While the beam/footprint of a satellite moves across the surface of the Earth relative to the movement of the satellite, the cells remain stationary or fixed (each satellite antenna continually adjusts the relative cell pattern of its respective beam to maintain a fixed/stationary cell pattern on the surface of the Earth—as the satellite moves, the satellite will continually service the cells of that cell pattern that are within the footprint of the satellite antenna beam). By way of example, a phased array antenna is employed on satellite, and the satellite is configured to dynamically determine the appropriate beamforming coefficients or weights, over given time intervals, in order to generate time varying beam patterns that illuminate the respective stationary cells on the ground. Further, each such ground-based cell may be assigned a fixed frequency/polarization (F/P) pair. Accordingly, as the communications platform moves, it forms the communications beams to illuminate the respective stationary cell pattern, where each cell is assigned a respective F/P pair. As such, a ground terminal located within a given cell utilizes a constant F/P pair for the fixed cell within which it is located irrespective of the satellite that is servicing the cell.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Figure 1A:
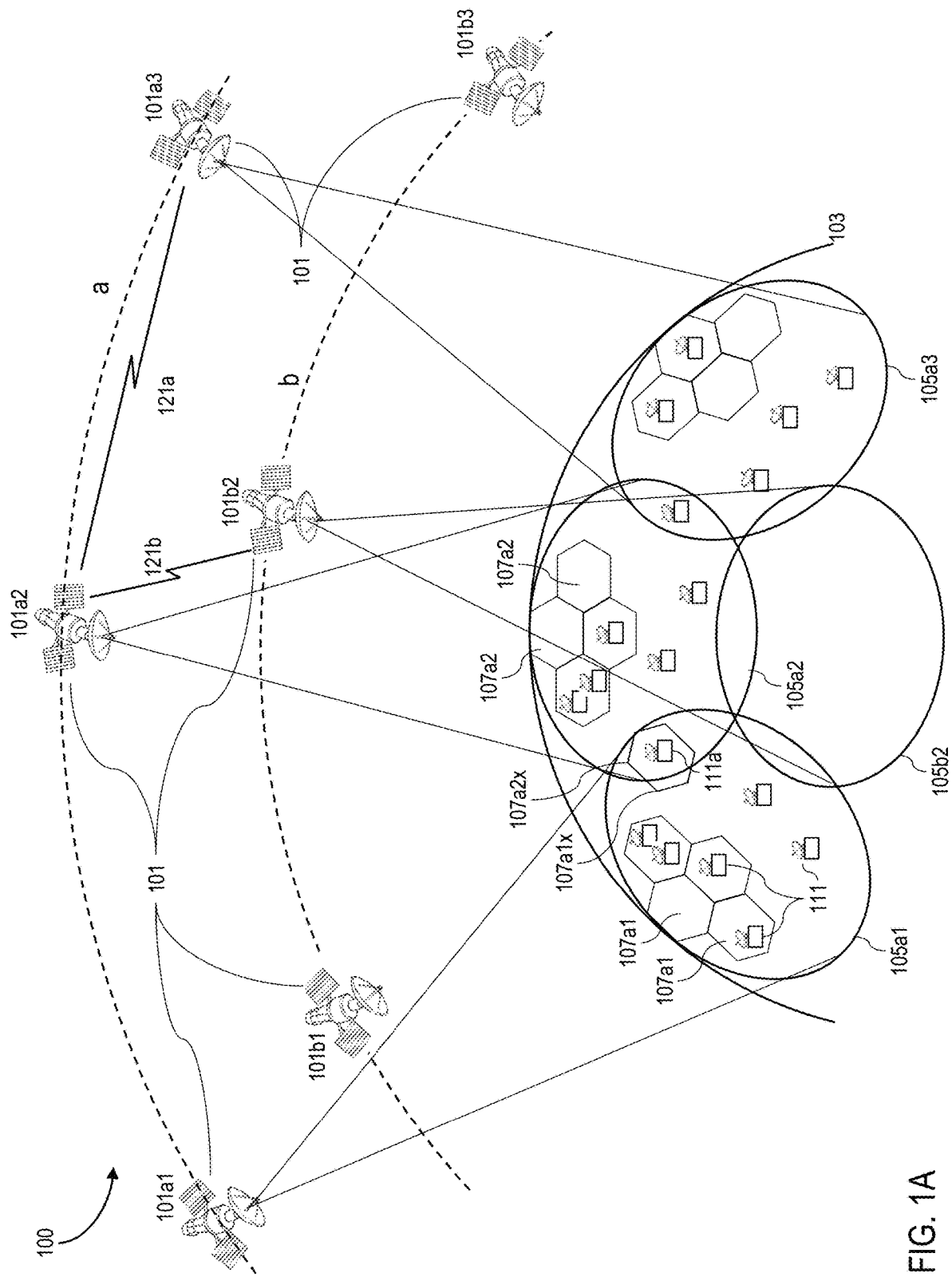
FIG. 1A illustrates an example satellite communications system (e.g., a LEO satellite system) for employing radio resource management and routing approaches for fixed data circuits, in accordance with example embodiments of the present invention.

Systems and methods for efficient radio resource management and routing functions to support long-term or relatively permanent data communications circuits between two geographically diverse endpoint terminals in a non-geostationary orbit (NGSO) wireless data communications system, such as a low earth orbit (LEO) satellite system, are described. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

FIG. 1A illustrates an example satellite communications system (e.g., a LEO satellite system) for employing routing approaches for fixed data circuits, in accordance with example embodiments of the present invention. While the following description of example embodiments of the present invention is in the context of a LEO satellite system, as would be appreciated, the aspects and concepts described herein would be applicable to any communications system employing one or more non-geosynchronous orbit (NGSO) airborne communications platforms that travel or move relative to the surface of the Earth (e.g., low earth orbit (LEO) satellite systems, medium earth orbit (MEO) satellite systems, and high altitude platform (HAP) based systems).

With reference to FIG. 1A, the satellite communications system 100 includes a plurality of satellites 101, which may hereinafter be referred to as a constellation. The satellites of the constellation travel around the Earth 103 in different orbital planes, such as the orbital planes a and b depicted in FIG. 1A. For example, the satellites 101a1, 101a2, 101a3 travel in the orbital plane a, and the satellites 101b1, 101b2, 101b3 travel in the orbital plane b (an orbital plane may also be referred to herein simply as a plane or orbit). By way of example, an orbital plane, the satellites may be distributed at relatively even distances apart so that the angular position between each adjacent pair of satellites is substantially uniform, and the orbital planes may be highly inclined relative to the equator to provide global coverage (e.g., the angle formed between the orbital plane and the equatorial plane is greater than 70 degrees). By way of further example, the orbital planes may also distributed in a substantially uniform manner. A satellite in accordance with example embodiments employs a multiple beam antenna (e.g., a phased array antenna) that illuminates a respective geographic region or footprint on the surface of the Earth, such as the regions 105a1, 105a2, 105a3, 105b2 of the satellites 101a1, 101a2, 101a3, 101b2, respectively. As the satellite moves through its orbit, the footprint/beam moves across the surface of the Earth relative to the movement of the satellite.

Each geographic region illuminated by a satellite antenna is further divided into spot beams or cells 107. Each spot beam or cell provides data communication services to the respective ground terminals 111 located within that cell. Further, according to certain example embodiments, while the beam/footprint of a satellite moves across the surface of the Earth relative to the movement of the satellite, the cells remain stationary or fixed (each satellite antenna continually adjusts the relative cell pattern of its respective beam to maintain a uniform cell pattern on the surface of the Earth—as the satellite moves, the satellite will continually service the cells of that cell pattern that are within the footprint of the satellite antenna beam). More specifically, considering the satellite 101a1 (for example), as the satellite travels through its orbit, the satellite will service the cells 107a1 while those cells are within the footprint of the respective satellite antenna beam. Further, at a certain point in time, for example, the cell 107a1x (within which the terminal 111a is located) will become positioned at the edge of the satellite beam 105a1, and the link margin for the services provided to the terminal 111a will diminish). By this point in time, however, the satellite 101a2 will have moved into a position where the cell 107a1x is now within the footprint of its antenna beam, and that cell can be transitioned to the satellite 101a2 for the duration of time that the cell is within the footprint of that satellite (now labeled in the Figure as cell 107a2x). Accordingly, from the standpoint of the terminal 111a, it remains in the same cell (the same frequency and polarization), but the communications services for the cell are transitioned from satellite to satellite (in this case, from the satellite 101a1 to the satellite 101a2). In order that the service to the terminal 111a is not interrupted, a handoff or handover will be performed transferring the service for the terminal 111a from the cell 107a1x of the satellite 101a1 two the cell 107a2x of the satellite 101a2 (effectively the same cell, but serviced by a new satellite). Further, each satellite also may employ one or more inter-satellite links (ISLs) providing for data communications between that satellite and neighboring satellite, such as the ISL 121a between the satellites 101a2 and 101a3 and the ISL 121b between the satellites 101a2 and 101b2.

Figure 1B:
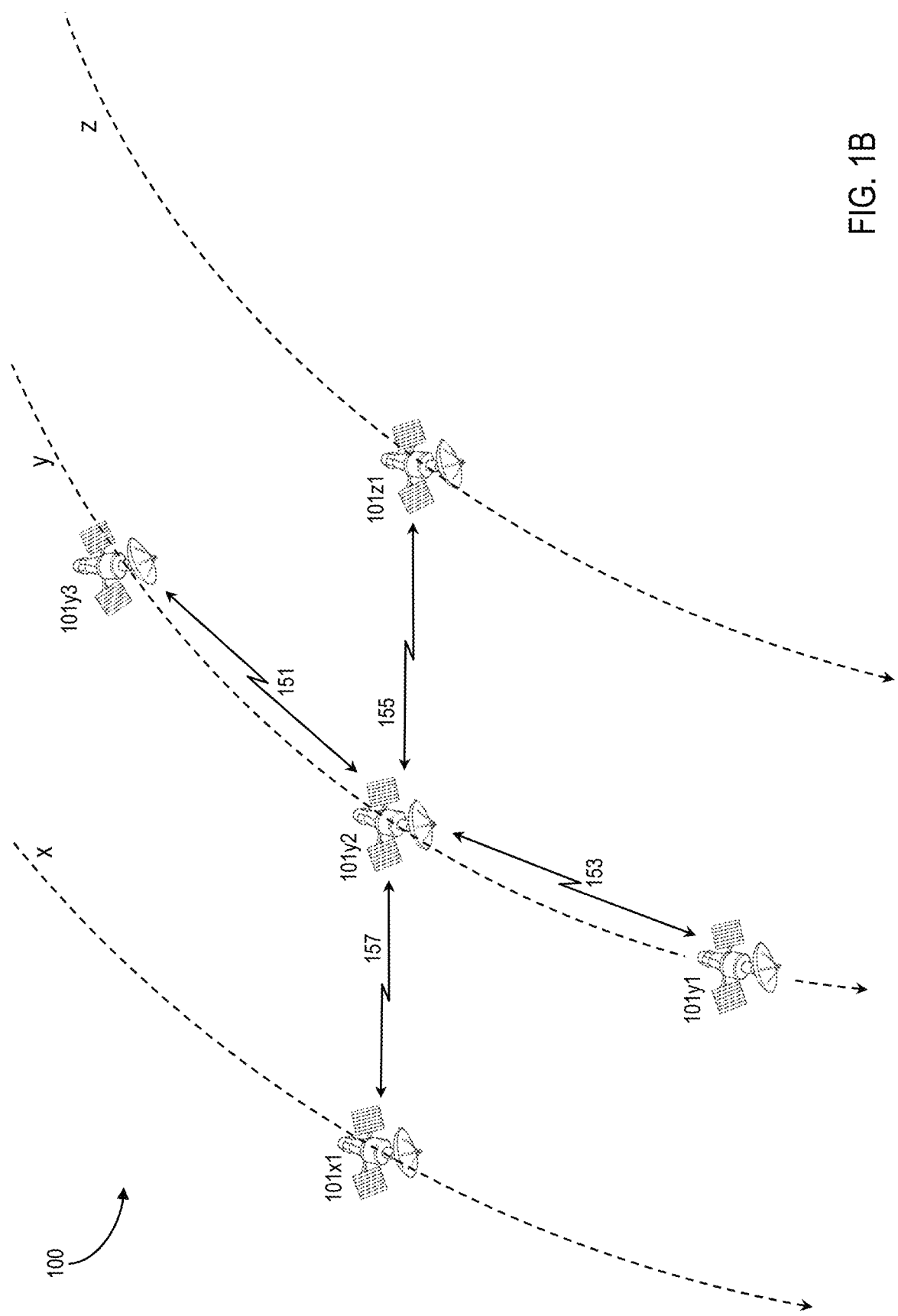
FIG. 1B illustrates a diagram of one example where each satellite (e.g., as shown in the Figure for the satellite 101y2) employs a total of four inter-satellite links (ISLs) between itself and neighboring satellites, in accordance with example embodiments of the present invention.

With further regard to inter-satellite links, FIG. 1B illustrates a diagram of one example where each satellite (e.g., as shown in the Figure for the satellite 101y2) employs a total of four inter-satellite links (ISLs) between itself and neighboring satellites, in accordance with example embodiments of the present invention. Further, while the ISLs are depicted as bidirectional in the Figure, any one (or all) of them may alternatively be unidirectional). As illustrated in FIG. 1B, at a particular point in time during the orbit of the various satellites in the constellation, for example, the satellite 101y2 (within the orbital plane y) has an active ISL 151 with the satellite 101y3 directly behind it in the same orbital plane, has an active ISL 153 with the satellite 101y1 directly ahead of it in the same orbital plane, has an active ISL 155 with the satellite 101z1 in the orbital plane z directly to its left (from the perspective of the satellite 101y2 moving downwards in the orbital plane, as indicated by the arrow at the end of the dashed line reflecting the orbital plane y), and has an active ISL 157 with the satellite 101x1 in the orbital plane x directly to its right (again, from the perspective of the satellite 101y2 moving downwards in its orbital plane). With further regard to the example of FIG. 1B, as would be appreciated, within an orbital plane, because the satellites remain relatively uniform around the orbital plane, for any given satellite, the adjacent satellites ahead of and behind that satellite remain constant, and thus the ISLs between adjacent satellites within an orbital plane can remain constant. For the ISLs between satellites in adjacent parallel orbital planes, as would be recognized by one of ordinary skill in the art, depending on the positions of two adjacent satellites (at a given point in time) within their respective orbital planes and the respective locations of those orbital planes around the earth, the length of time that a given ISL between two such satellites will vary. For example, there will be times that two such satellites may be passing by each other at very rapid rates, and thus an ISL between those two satellites at that point in time will not be active for a long period of time (e.g., that ISL may only be valid for a period of time on the order of one to a few seconds)—whereas there will also be times that two such satellites may be able to support an ISL between them for a relatively longer period of time. Based on the configuration of the constellation and monitoring of satellite positioning based on ephemeris information that may be broadcast by the satellites of the constellation (in systems where the satellites broadcast their ephemeris information reflecting position and velocity vector information of the satellite), however, the network operations center of the system will have relatively accurate knowledge of the positions of each satellite within the constellation at all times.

In accordance with example embodiments of the present invention, the provided system and methods employ radio resource management and routing functions to provide long-term or relatively permanent data communications circuits between two geographically diverse network terminals 111. According to one embodiment, the system comprises a constellation of NGSO satellites (e.g., LEO satellites, MEO satellites or a combination of LEO and MEO satellites) in at least one orbital plane operating in at least one altitude. According to a further embodiment, the system comprises a constellation of satellites configured with a plurality of NGSO satellites in each of multiple orbital planes, where the satellites are spaced around each orbital plane, and the multiple orbital planes are spaced at various inclinations around the earth, in order to provide global satellite coverage over the relative entire surface of the Earth. According to such embodiments, the system further comprises a network processing function (which could be centralized, distributed, or in the cloud) configured to determine and control the radio resource management in the routing functions of the network, and a plurality of user satellite terminals (UTs) configured to communicate with one another via data communications services provided by the satellite constellation and the network processing function. The data communications between the UTs are carried directly between the UTs via the satellite constellation (or via a combination of the satellite constellation and one or more intermediate gateways), based on a plurality of routing tables determined and provided by via an algorithm configured to address the continually changing routes among the constellation of satellites within the network. By way of example, a routing table comprises a list of routes, with each route having a valid period and each route consisting of a set of "next hops" to go from the source terminal to at least one destination terminal. The valid period, for example, might be expressed as a fixed duration of, say, one second, or as a start and end time, say 3:00 PM to 3:11 PM on a given date. Further, according to a further embodiment, the system may be configured to employ a fixed reuse pattern on the ground and a resource management function, which would significantly simplify capacity plan computations based on, for example, elimination of the need to compute interference.

Figure 2A:
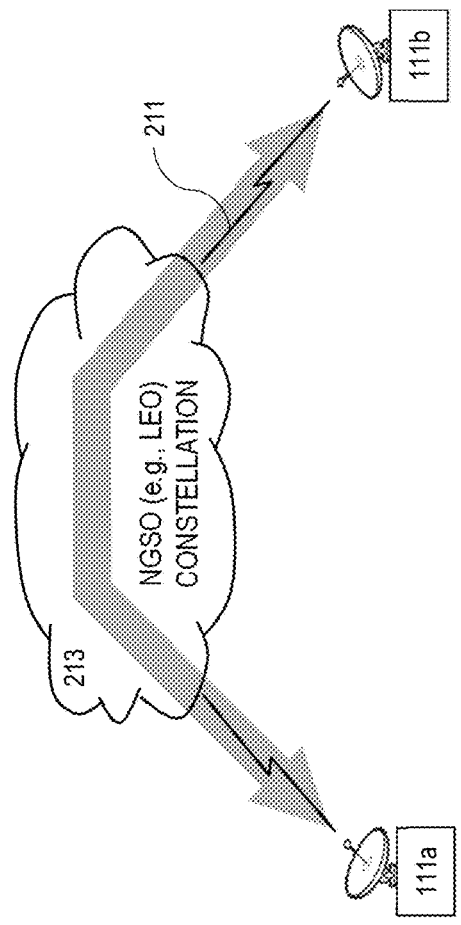
FIG. 2A illustrates a diagram of a point-to-point data communications connection or circuit between two edge terminals via an NGSO (e.g., LEO) satellite constellation, in accordance with example embodiments of the present invention.

According to such embodiments, the provided approaches facilitate the provision of a carrier-grade data communications service or circuit (e.g., a committed information rate circuit/service) between a UT or user network interface (UNI) and at least one other UT or UNI, where the "carrier-grade" implies a high availability, low latency, low error rate connection that remains continuous even as the satellites move and the respective packet data routes of the circuit continually change. FIG. 2A illustrates a diagram of a data communications circuit 211 between a one terminal 111a and a further terminal 111b via the NGSO (e.g., LEO) satellite constellation 213, in accordance with example embodiments of the present invention. By way of example, the terminals 111a, 111b may each serve as a user network interface (UNI) through which a plurality of network users access the network and provided services (e.g., the data communications services provided by one or more circuits 211). By way of further example, the circuit 211 may comprise a point to point Ethernet virtual circuit (EVC) through the satellite constellation 213. Further, each UNI may be located at a very small aperture terminal (VSAT) or a gateway terminal (GW), or a UNI may alternatively be an additional network entirely. Accordingly, the service may comprise a UNI to UNI service or a UNI to external network-network interface (ENNI) service. Further, multiple satellites are in view at all times (e.g., with fully deployed satellite constellations), and inter-satellite links (ISLs) and Gateways move traffic between satellites as needed.

Figure 2B:
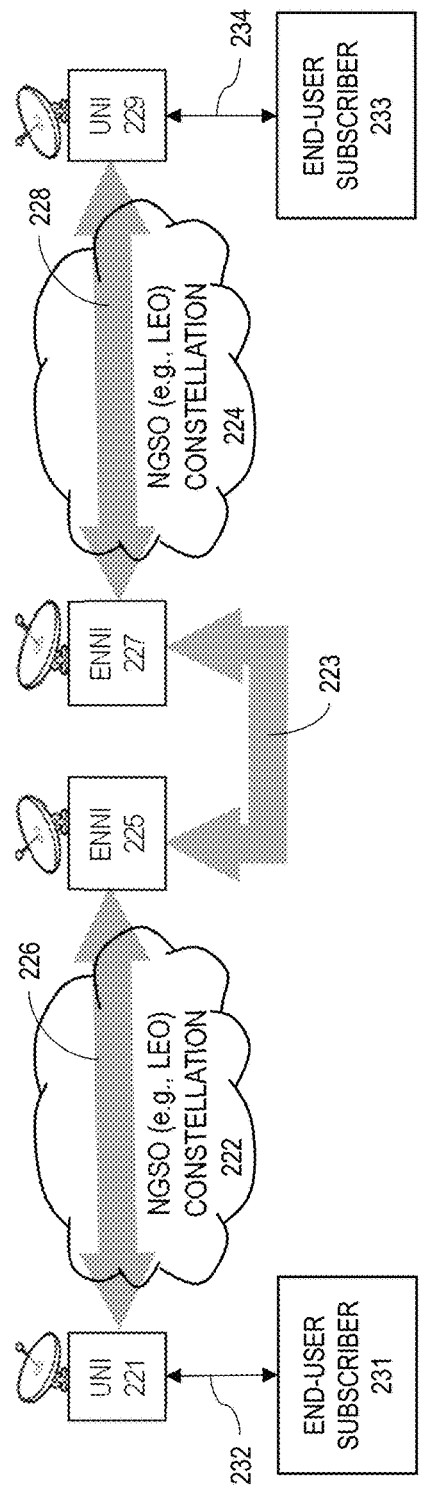
FIG. 2B illustrates diagram of a Metro Ethernet Forum (MEF) circuit framework via two separate NGSO (e.g., LEO) satellite constellations, in accordance with example embodiments of the present invention.

By way of example, one framework for providing such carrier-grade services or circuits is the metro Ethernet forum (MEF). The MEF is a nonprofit international industry consortium, composed of service providers, incumbent local exchange carriers, network equipment vendors, and other networking companies, that functions to facilitate the definition, design and adoption of carrier ethernet networks and services. As described at the MEF website (www.mef.net), "[t]he MEF is a California, USA registered 501c(3) industry association that is the enabling force for the development and implementation of agile, assured and orchestrated Third Network services for the digital economy and the hyperconnected world, where such "Third Network services are delivered over automated, virtualized, and interconnected networks globally powered by Carrier Ethernet 2.0 (CE 2.0), Lifecycle Service Orchestration (LSO), SDN, and NFV." The MEF describes standards for offering a service between an ingress and egress point. More detailed information about the MEF can be found at the website mef.net. By way of further example, other services may consist of cellular backhaul, or connection of other carrier MEF networks together. FIG. 2B illustrates diagram of an MEF circuit framework via two separate NGSO (e.g., LEO) satellite constellations 222, 224, in accordance with example embodiments of the present invention. Each of the end-user subscribers 231, 233 accesses the respective UNI 221, 229 via a respective network interface 232, 234. According to one embodiment, the network interfaces 232, 234 consist of direct interfaces or connections. According to further embodiments, however, such interfaces may be via a LAN or WAN, which may be via a terrestrial, satellite or other type of network. A carrier ethernet circuit 226 is provided between the UNI 221 and the ENNI 225 via the constellation 222, and a carrier ethernet circuit 228 is provided between the ENNI 227 and the UNI 229 via the constellation 224. The ENNIs 225, 227 interface with each other via the external network-network interface 223. Alternatively, a single constellation may provide the carrier ethernet circuits between two edge UNIs. In any configuration, however, the approaches provided in accordance with example embodiments of the present invention are applicable to each of the individual circuits between two respective UNIs. The particular protocol pursuant to which the circuit is provided, however, need not necessarily be the Ethernet protocol, but rather may take the form of any networking protocol or layer of protocols capable of facilitating such carrier grade circuits. To access the subscribed to circuits, an end-user subscriber site interfaces with the network via a respective protocol interface at an UNI configured or assigned to serve as an ingress/egress point for accessing the network from that end-user subscriber site.

With a traditional LEO satellite, the satellite antenna generates a fixed cell pattern within the antenna footprint, according to the antenna geometry and coefficients applied to the phased array antenna elements, within the antenna coordinate system—meaning that the cell pattern is fixed relative to the illumination of the beams at the satellite phased array antenna. As such, because the cell pattern is fixed relative to the antenna coordinate system, as the satellite travels in its orbit, the cell pattern moves across the face of the earth. Further, as the cell pattern moves across the face of the earth, the particular servicing a given terminal will change rapidly and the respective shape of each cell will vary relative to the angle of inclination of the satellite beam and the distance of the satellite from the earth (as the orbit of a satellite is not necessarily circular and is typically more elliptical in shape, and thus the angle of inclination of the satellite beam relative to the Earth and the distance of the satellite from the Earth changes throughout the orbital path). Accordingly, as mentioned above, with such a traditional LEO satellite, the frequency of handovers for a given terminal is relatively high. Alternatively, the satellite and satellite antenna may instead generate dynamically varying spot beams that illuminate a fixed cell pattern on the surface of the Earth, which remains stationary as the satellite travels over respective coverage areas on the surface of the Earth. With such an approach, the particular cell servicing a given terminal remains constant for a substantially longer period of time, and thus the frequency of handovers is significantly reduced.

In accordance with example embodiments, therefore, a cell layout created by each satellite of a satellite system constellation may comprise a contiguous pattern of hexagonal cells covering a respective geographic region on the Earth's surface. In such a system, a fixed reuse pattern may be employed amongst the cells, where the reuse pattern satisfies requirements for mitigating interference between cells and satisfies all applicable regulatory rules (e.g., spectrum usage, maximum power flux density limitations, etc.) and other applicable rules/requirements. Further, in accordance with one approach, a nearly constant capacity density is provided across the cell patterns of each satellite footprint, which in turn could facilitate a committed information rate (CIR) service over a particular circuit throughout all periods of time that the circuit is operational, and such a service may be established anywhere within the system. Further, the pattern and capacity density allocation may remain relatively uniform throughout the system life, or the cell sizes and respective capacity density allocation may evolve as the satellite constellation matures over time (e.g., as the business matures, and demand increases, the cell patterns can be redefined over time to meet the maturing business requirements/demands. Further, the provided approaches accommodate the addition/deletion of customers and the addition/deletion of circuits for a given customer. For example, as new customers/subscribers come on board, or existing customers add additional circuits or increase bandwidth of existing circuits, the overall resource management and the routing tables for the existing circuits can be redefined to accommodate the added circuits and increased bandwidth (e.g., to accommodate modified load balancing to avoid overloading any nodes of the system during respective periods of time).

In the following description, a process for constructing the static routing table from available information is described, wherein it is assumed that the table is generated from a central computer, or alternatively via a distributed computing architecture (e.g., a cloud-based architecture), and then distributed to the UTs and GWs. Further, variations may include storage in the satellite or generation in a more distributed fashion. In accordance with example embodiments of the present invention, while the approaches provided thereby may be applied to a system employing a constellation of satellites utilizing a fixed beam or cell pattern relative to the respective satellite antenna, the embodiments described herein address a system employing a constellation of satellites utilizing a fixed ground-based spot beam or cell pattern approach. As introduced above, such satellite antennae generate dynamically varying spot beams (relative to the plane of the satellite antenna or the satellite antenna coordinate system) that illuminate a fixed cell pattern on the surface of the Earth, which remains stationary as the satellite travels over respective coverage areas on the surface of the Earth. Such an approach for fixed ground-based spot beams is more fully described in the co-pending patent application titled "UNIFORM FIXED GROUND-BASED CELLS IN AN NGSO SATELLITE COMMUNICATIONS SYSTEM," under the named inventorship of Anthony Noerpel, Udaya Bhaskar and Stanley Kay, the entirety of which is incorporated herein reference.

According to example embodiments, a service and routing function are provided, which facilitates the establishment and maintenance of fixed circuits between geographically diverse ground terminals, whereby (for a given circuit) the routing function determines and specifies a series of routes over time, where each route specifies a valid route between two respective terminal endpoints for a respective period of time. According to such embodiments, the radio resource management (RRM) function may create a quasi-static uplink capacity plan for the entire network, which is quasi-static from the perspective of the UNI (the ingress/ egress GWs or UTs with which the customer is networked or interfaces for access to its assigned circuits). By way of example, the RRM function provides an uplink burst plan for each UNI of the network, which allocates a specific time plan for uplink bursts to each satellite with which the UNI will be communicating during a respective period of time. The operation of the uplink capacity planning and the uplink burst assignments to the UNIs of the network is discussed in further detail below. According to one such embodiment, the uplink traffic of a UT is at a steady rate independent of satellite positions. Additionally, according to a further such embodiment, the RRM may also accommodate some degree of variability on top of the plan, for example, supporting new terminals and some bandwidth on demand. Further, in accordance with certain embodiments, downlink traffic from any given satellite and the destination ground terminal may be dynamic without a plan, where distributed congestion management may be applied to minimize packet loss. The operation of the point and shoot downlink functionality of each of the satellites of the constellation is also discussed in further detail below.

Figure 3A:
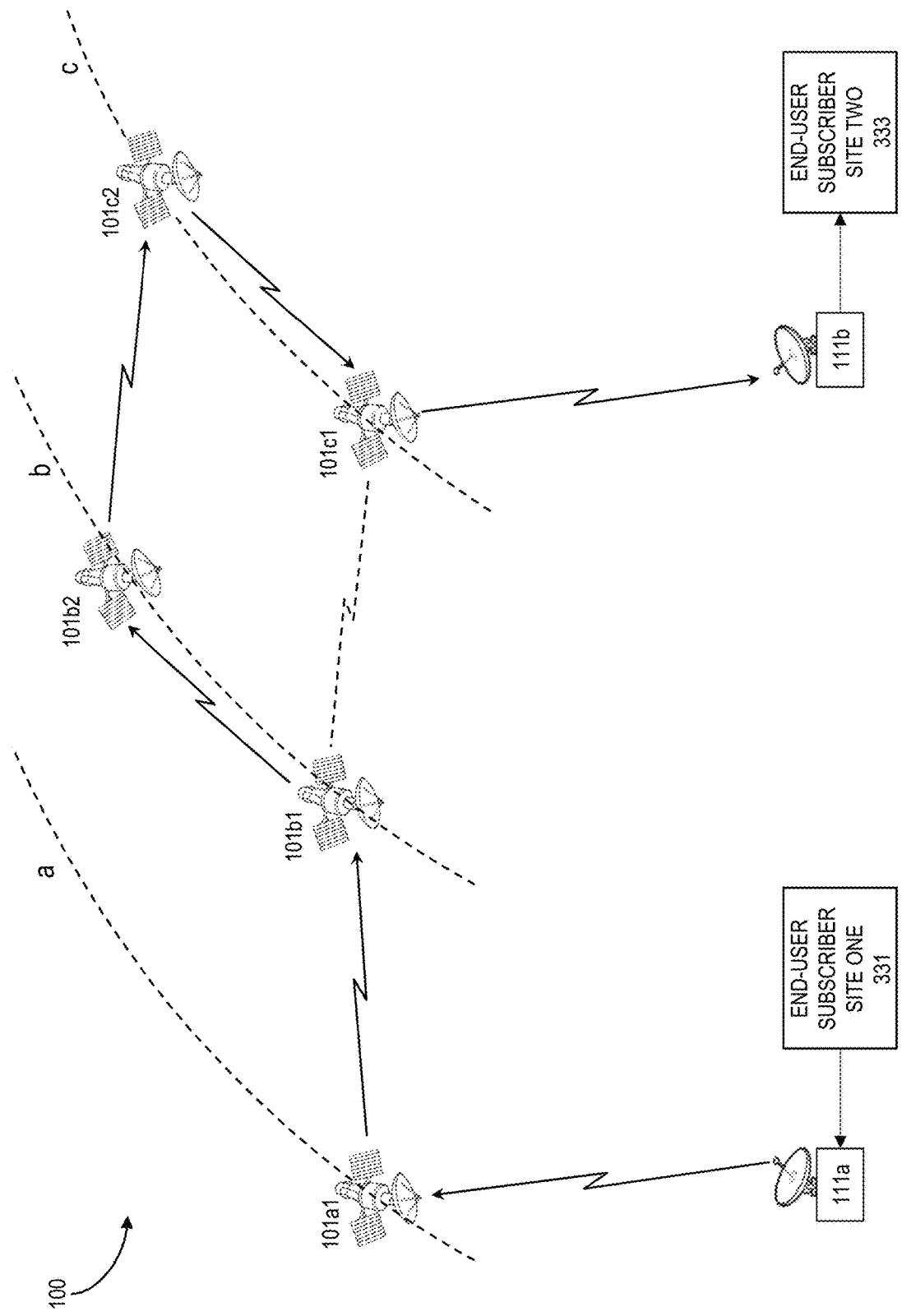
FIG. 3A illustrates an example route for data communications from one end-user subscriber to another end-user subscriber, during a first period of time, via a fixed circuit between two UNIs, through an NGSO (e.g., a LEO) satellite constellation, in accordance with example embodiments of the present invention.
Figure 3B:
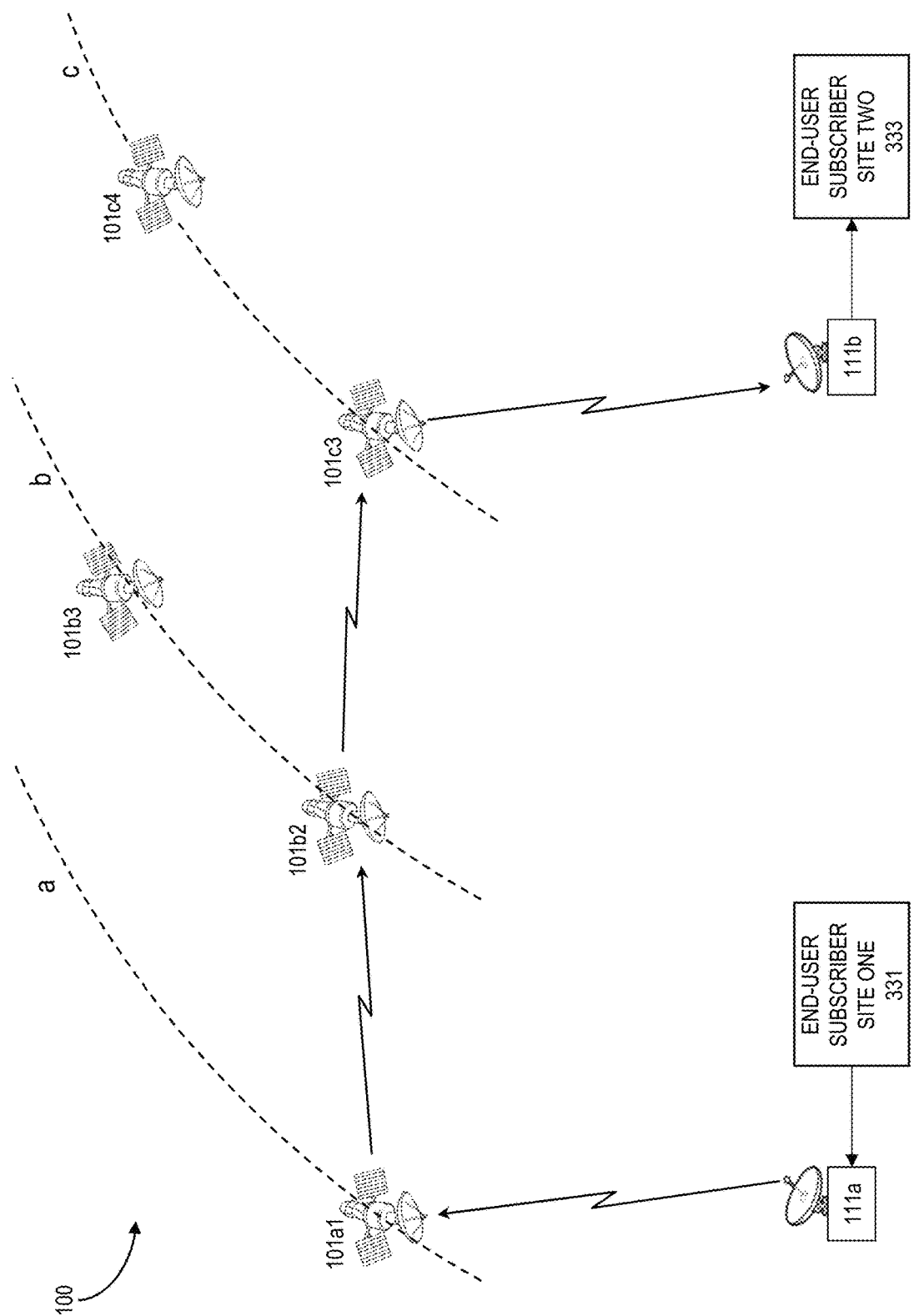
FIG. 3B illustrates an example route for the data communications of FIG. 3A, from the one end-user subscriber to the other end-user subscriber, during a second period of time, via the same fixed circuit between the two UNI terminals, in accordance with example embodiments of the present invention.

By way of example, FIG. 3A illustrates an example route for data communications from one end-user subscriber 331 to another end-user subscriber 333, during a first period of time, via a fixed circuit between two UNIs 111a, 111b, through an NGSO (e.g., a LEO) satellite constellation 100, in accordance with example embodiments of the present invention. Further, FIG. 3B illustrates an example route for the data communications of FIG. 3B, from the one end-user subscriber 331 to the other end-user subscriber 333, during a second period of time, via the same fixed circuit between the two UNIs 111a, 111b, in accordance with example embodiments of the present invention. The routes depicted in FIGS. 3A and 3B reflect data communications of an end-user subscriber from the end-user subscriber site one 331 (e.g., located in New York) to the site two 333 (e.g., located in London). The end-user subscriber site one interfaces with the network via the UNI 111a (e.g., via network facility such as a LAN or WAN) and the end-user subscriber site two interfaces with the network via the UNI 111b (e.g., also via network facility such as a LAN or WAN). For the circuit routes depicted in FIGS. 3A and 3B, for example, the end-user subscriber may have contracted with the system operator or service provider for a permanent circuit (e.g., contracted for a particular contract period and guaranteed bandwidth or constant information rate between the New York and London sites 331, 333). Further, in an alternate example, the circuit between these two sites may have been contracted for operation only during business hours in New York (e.g., Monday through Friday, 9 to 5). In any event, for that circuit, each of the respective UNIs 111a, 111b must know the appropriate routes for data packets to traverse the satellite constellation 100 between them at any given time during the operable period for the circuit.

Accordingly, each of the UNIs 111a, 111b will have a route table corresponding to that particular circuit between the end-user sites 331, 333, which contains a list of routes providing each particular route that will be valid, and that should be used for data packet transmissions over the circuit, during a respective period of time, and covering every period of time that the circuit is required to be available. In that context, for every circuit that a UNI services, the UNI will have a route table that specifies, from one point in time to the next, the appropriate route for data packets received by the UNI for transmission over the respective circuit. Thus, at any given time, a single UNI may be servicing multiple circuits respectively for one or more end-user subscribers, with each circuit being to a different UNI at a different geographically diverse location, where that UNI will have a routing table for each such circuit.

With reference to FIG. 3A, for example, as data packets arrive at the UNI 111a from the end-user subscriber site 331 for transmission to the end-user site 333 during the first period of time, the UNI 111a will apply the respective route from the route table corresponding to that circuit that is valid for the first period of time. For that route, the route table will list the satellite 101a1 as the first-hop destination, the satellite 101b1 as the second-hop destination, the satellite 101b2 as the third-hop destination, the satellite 101c2 as the fourth-hop destination, the satellite 101c1 as the fifth-hop destination, and the UNI 111b as the sixth-hop destination. For each hop destination, the route table will include an appropriate address or other indicator identifying the respective destination satellite or terminal node. For each such packet, the UNI 111a will append a header to the packet indicating the series of hops for the route, and will then transfer the packet with the route header to the satellite 101a1 as the first-hop destination. The route header will identify the next hop destination to the satellite 101a1. Upon receipt of the packet, the satellite 101a1 will decode the header to determine the next hop destination (the second-hop destination—the satellite 101b1), will modify the route header in a manner to identify the next hop destination from the satellite 101b1 (the third-hop destination—the satellite 101b2), and will transmit the packet (with the modified header) to the satellite 101b1. Upon receipt of the packet, the satellite 101b1 similarly will decode the header to determine the next hop destination (the third-hop destination—the satellite 101b2), will modify the route header in a manner to identify the next hop destination from the satellite 101b2 (the fourth-hop destination—the satellite 101c2), and will transmit the packet (with the modified header) to the satellite 101b2. This progression of the packet will continue until it reaches the satellite 101c1, which will decode the header to determine the next hop destination as the UNI 111b, and will download the packet to the UNI 111b. The UNI 111b will then transmit the packet to the end-user subscriber site 333 based on an ultimate destination address (e.g., a destination IP address). According to one embodiment, for each hop, the respective satellite may strip (or otherwise nullify) the header information relative to the route hop to the next satellite in the route so that (as received by that next satellite) the next hop route destination will effectively be the first hop destination relative to that next satellite in the route—the next satellite of the route does not need the header information based on which the packet arrived at that satellite, but rather only needs the information for the next hop destination from that satellite. Next hop routing is well understood in the industry.

With reference to FIG. 3B, as data packets subsequently arrive at the UNI 111a from the end-user subscriber site 331 for transmission to the end-user site 333 during the second period of time, the UNI 111a will then apply the respective route from the route table corresponding to that circuit that is valid for the second period of time. For that route, the route table will list the satellite 101a1 as the first-hop destination, the satellite 101b2 as the second-hop destination, the satellite 101c3 as the third-hop destination, and the UNI 111b as the fourth-hop destination. In this example, during the second period of time, the ISLs between the respective satellites to complete the circuit have changed, and thus the route for that period of time will traverse a different series of satellites, as indicated by the route entry for that circuit during the second period of time. Further, with reference again to FIG. 3A, while there is an ISL (shown in a dashed line) between the satellites 101b1 and 101c1, this link may not have been chosen for that circuit route during the first period of time for one or more of a number of particular reasons. For example, that particular ISL may not have been chosen for that period of time because of a determined potential overload of the ISL at that time. Further, each route stored in a route table, for example the route for the time period t=0, is determined such that the designated path from the source UNI to the destination UNI is valid from the beginning of the time period at t=0 to the beginning of the time period at t=1. Various factors considered in determining the particular routes for any given period of time are discussed in further detail below.

By way of example, the following table reflects a route table that would be stored at the UNI 111a for all routes, during all applicable time periods, for a circuit to the UNI 111b (t=1 corresponds to the first period of time for the route depicted in FIG. 3A, and t=2 corresponds to the second period of time for the route depicted in FIG. 3B (as would be appreciated, the structure of the route tables and the entries for the respective routes may take on any of a myriad of different forms without departing from the concepts of the embodiments of the present invention):

| TIME | ROUTES TO UNI 111b |
| --- | --- |
| t = 1 | 101a1; 101b1; 101b2; 101c2; 101c1, UNI 111b |
| t = 2 | 101a1; 101b2; 101c3; UNI 111b |
| t = 3 | hop 1; hop 2; . . . ; hop n |
| t = 4 | etc. |

Similarly, by way of further example, the following table reflects a route table that would be stored at the UNI 111b for all routes, during all applicable time periods, for the same circuit in the other direction to the UNI 111a.

| TIME | ROUTES TO UNI 111b |
| --- | --- |
| t = 1 | hop 1; hop 2; . . . ; hop n |
| t = 2 | hop 1; hop 2; . . . ; hop n |
| t = 3 | hop 1; hop 2; . . . ; hop n |
| t = 4 | etc. |

According to such embodiments, therefore, each UNI serving as an ingress point to the satellite constellation will be provided with, and store within its memory, respective routing table for each circuit defined between it and a further UNI serving as an egress point from the satellite constellation. Further, the routes stored in a routing table for a particular circuit between two UNIs (one UNI serving as an ingress point to the satellite constellation and a second UNI serving as an egress point from the satellite constellation) will continually change over time as the satellites servicing the respective UNIs change and as the ISLs between the satellites of the constellation change. Additionally, in accordance with further example embodiments, each UNI will be provided with, and store within its memory, an uplink burst time plan providing timing/synchronization information as to when to transmit the data packets of the circuits serviced by the UNI. Further, according to example embodiments, each UNI can synchronize with a given satellites servicing that UNI at any given point in time based on any known synchronization method, such as synchronization based on ephemeris information provided by the satellites.

According to yet further example embodiments, within any route, a gateway may serve as an intermediate node or hop destination within the route. By way of example, at a particular satellite hop node within a route, the next route may be specified as a downlink to a gateway in communication with the satellite during the respective period of time for that route. In the same manner as described above for the route, the satellite would modify the header route information for the data packet to specify the next hop from the gateway as, for example, a next satellite hop destination in the route, and would downlink the packet (with the modified header) to that gateway hop destination. Upon receipt of the data packet, the gateway would similarly modify the header route information for the packet and transmit the packet (with the modified header) to the next satellite hop destination, whereby the header would identify and appropriate further satellite hop or a downlink to the destination UNI (in the event that the satellite was the last satellite/hop of the route) as the next hop.

With regard to uplink burst scheduling for the respective UNIs of the system (in the UNI's capacity as an ingress point to the network), according to example embodiments, as introduced above, the RRM function provides an uplink burst plan for each UNI of the network, which allocates a specific time plan for uplink bursts to each satellite with which the UNI will be communicating during a respective period of time. By way of example, the uplink burst scheduling for a particular UNI (in its capacity as an ingress UNI for various circuits of various respective end-users subscribers) will largely be based on the service level agreement commitments to each of the respective end-users subscribers for each of the circuits contracted for by that end user subscriber. In that regard, for a given customer circuit serviced by a particular UNI, the uplink burst time plan for that UNI will include the required assignment of uplink bursts to satisfy the bandwidth/information-rate as contracted for by the customer. Further, as would be appreciated by one of skill in the art, the overall uplink burst scheduling for the system would also be orchestrated to accommodate for various system factors, including the satellite availability for each UNI satellite terminal of the system at any given point in time, and the current load of each satellite available to each such UNI at a given point in time (including the overall load of the satellite beam within which the UNI is located and the current load of each of the ISLs of that satellite) in order to avoid congestion and overloading of any given satellite transmission channel or link. Additionally, other such factors may include the quality of the link of each satellite available to each such UNI at a given point in time and required circuit information rates for the respective circuits being serviced by that UNI, and potential downlink congestion of a particular satellite and other issues such as satellite downlink queue overflows or head of line blockage, etc. Additionally, as would be appreciated by one of ordinary skill in the art, various other system factors may impact the uplink burst scheduling for each UNI in the network. With further regard to the uplink bursts schedule for the system, that schedule will change over time to accommodate additional circuits of existing or new end-user subscribers and the termination of existing circuits as the system demand evolves.

Figure 4:
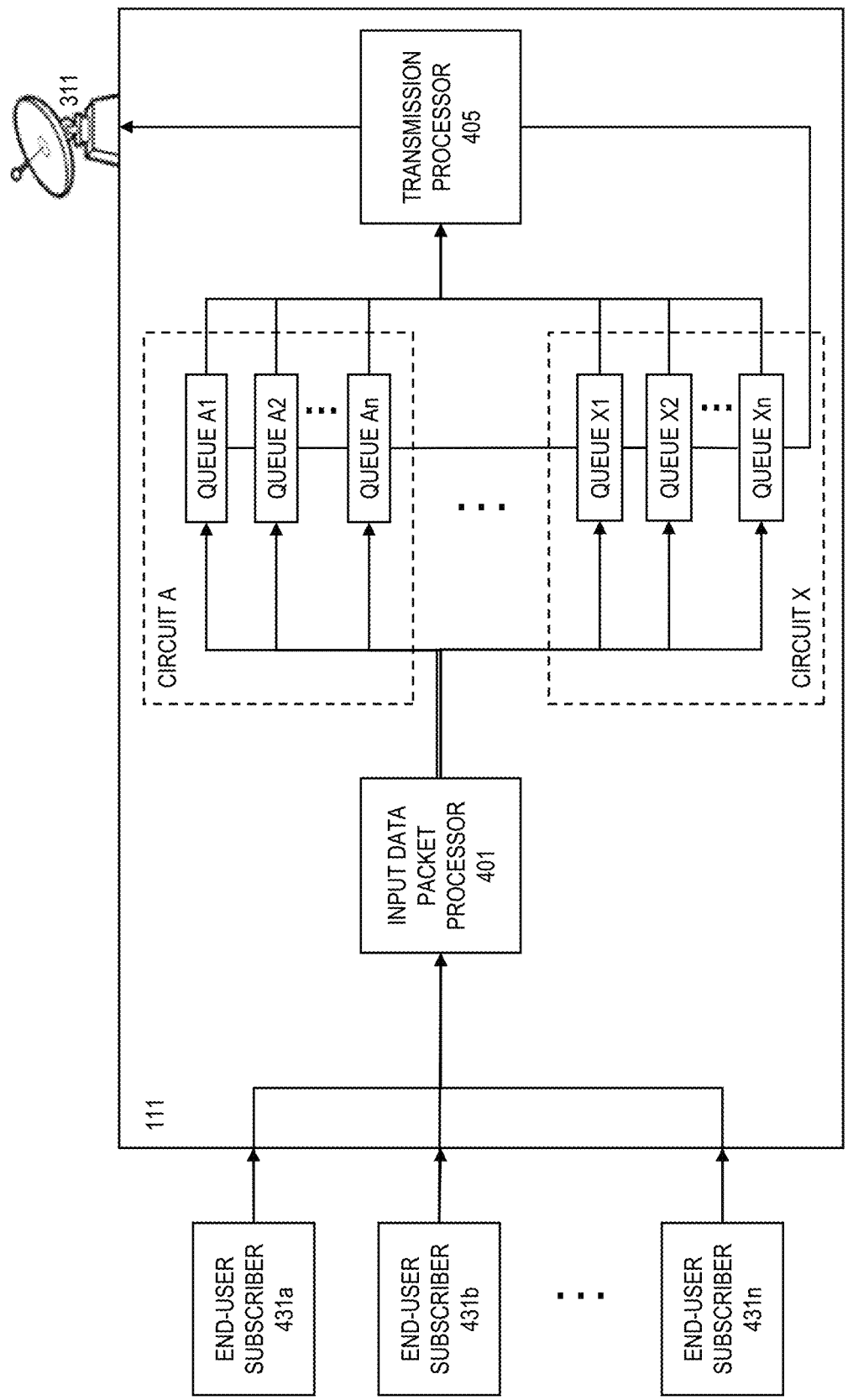
FIG. 4 illustrates a diagram of the processing performed by a UNI terminal for input data packets received by that UNI and destined for uplink to various respective circuits of end-user subscribers serviced by that UNI, in accordance with example embodiments of the present invention.

According to one such embodiment, FIG. 4 illustrates a diagram of the processing performed by a UNI satellite terminal for input data packets received by that UNI and destined for uplink to various respective circuits of end-user subscribers serviced by that UNI, in accordance with example embodiments of the present invention. With reference to FIG. 3, the end-user subscribers 431a to 431n interface with the UNI 111 for transmission of data packets via the circuits A to X serviced by the UNI 111. The data packets input to the UNI 111 from the respective end-user subscribers are received by the input data packet processor 401. The input data packet processor processes the received packets, and based on header information of each packet, the input data packet processor determines which particular circuit the packet is destined for (one of the circuits CIR-CUIT A, . . . , CIRCUIT X) and determines a respective priority level for the packet within a range of priority levels of data packets for the respective circuit. Based on the determined circuit and respective priority level, the input data packet processor forwards each packet to a respective queue for packets of that circuit and priority level combination. For example, as depicted in the Figure, there are n priority levels for each of the circuits A-X, an each packet of the CIRCUIT is forwarded to a respective queue based on its determine priority level (one of the queues A1, A2, . . . , An), and similarly for each of the other circuits.

The transmission processor 405 controls the dequeueing of the data packets from the respective queues and the processing of the data packets for transmission, and once processed for transmission, the transmission processor transmits the packets via the UNI antenna 311 for uplink to a respective satellite. By way of example, the transmission processor 405 dequeues the packets from the respective queues based on circuit priority and packet priority within that circuit. Further, the transmission processor may also take other factors into account when dequeueing the packets, such as congestion control and avoidance of queue overflows. As each data packet is dequeued, the transmission processor 405 processes the packet for transmission and transmits the data packet via the next available uplink burst (as scheduled by the uplink burst time plan for the UNI 111) in the order that the packets are dequeued. According to an alternative embodiment, each data packet may simply be process based only on the respective circuit over which that packet is to be transmitted. In that case, each circuit will have only one queue, and the packets will be dequeued from the respective queues based on priorities between the respective circuits. As will be further appreciated, various alternative methods for processing cueing and transmitting packets may be implemented without departing from the scope of example embodiments of the present invention.

With regard to the downlink of data packets by a respective last hop satellite of a circuit to the destination egress UNI satellite terminal, according to one example embodiment, the downlink is performed in a point and shoot manner as each packet is processed and ready for downlink by the respective satellite. By way of example, as such a satellite processes each data packet for downlink transmission to the destination egress UNI, the satellite simply transmits the packet within the next available time slot of the downlink spot beam for the cell within which that UNI is located. By way of further example, as with the cell pattern of the uplink beam of a given satellite, the downlink cell pattern may also be of a fixed nature, for example, with respect to frequency reuse in order to satisfy requirements for mitigating interference between cells and to satisfy applicable regulatory rules.

In the context of example embodiments of the present invention, certain underlying principles are employed. By way of example, terrestrial RRM minimizes the satellite requirements and creates a cleaner functional break, which significantly reduces system roll-out and testing time. By way of further example, there is a tradeoff between satellite constellation complexity and the level of dynamic functionality employed, where mission demands may justify or require at least some dynamic assignment. The balance between constellation complexity and dynamic functions, however, may change over system life, but a minimal risk approach may be employed for launch of the system. Moreover, service demands may justify or require a dynamic downlink, where data rate may be controlled at the ingress UNI, but it does not dictate the data rate of the egress UNI. Even a static ingress can produce highly variable egress. Further, point and shoot may be ideal for this. Further, point and shoot, combined with adjacent cells being served by different satellites, may dictate a fixed cellular reuse pattern.

In the context of the example embodiments of the present invention, errors may occur in data packet timing, for example, whereby a data packet may arrive at a respective satellite hop either early or late such that the respective next hop route is no longer or is not yet available. Such early and late arrivals may occur under a variety of different scenarios. In one scenario, uplink timing may be in error, for example, whereby (i) the uplink UNI terminal processes the data packet based on an anticipated delay in its queueing structure (for an anticipated transmission time) in inserts the route information for that anticipated transmission time, and (ii) if in operation the packet dequeues early or late, the packet may arrive at a satellite node within the route early or late such that the ISL to the next satellite hop may no longer be available or the uplink to the first hop satellite may no longer be available. In a further scenario, the ISL timing may be in error, for example, a data packet may traverse up to as many as nine ISL hops to get to the last hop satellite, and even though the ISLs would generally be designed for very low queueing delay, packets can arrive early or late for a particular ISL transmission. Further, such cases also apply where a downlink to a gateway substitutes for an ISL hop to a next satellite. As your further scenario, the downlink timing may be in error, for example, similar to the scenario of an error in uplink timing, whereby (i) a data packet may arrive early or late at the last satellite hop of a route such that the destination egress UNI is not yet or is no longer available to the last hop satellite—such a scenario might occur based on the packet having to traverse several queues with statistically varying loading. Accordingly, various random processes inherent in the radio resource management and routing functions of embodiments of the present invention may lead to inevitable early/late data packet timing events.

In view of such potential timing errors, according to further example embodiments, early arrival may be mitigated by different procedures. According to one such embodiment for mitigating early packet arrival, data packets that arrive at a given node early may be dropped by that node. In that scenario, it may be up to the underlying transmission protocols, or the respective applications under which the data packet serve, to address the issue of dropped packets (e.g., by requesting retransmission). The solution of dropping the packets, however, may adversely affect packet loss rate objectives/requirements to the point where such objectives/requirements are no longer met. According to a further embodiment for mitigating early packet arrival, such early data packets may be rerouted. Such rerouting, for example, may be facilitated by (i) the source terminal or ingress UNI being configured to provide an alternative route for packets regarding which the terminal knows are likely to be transmitted near a timing boundary, (ii) the source terminal being configured to replicate packets known to arrive near timing boundaries, (iii) the satellite replicating packets regarding which the terminal knows are likely to be transmitted near a timing boundary (e.g., same data, but different labels), (iv) the node at which the packet arrives late being configured to downlink the late packet to a gateway for forwarding via a new route. According to yet a further embodiment for mitigating early packet arrival, the satellite node may be configured to save any such early packets for transmission via an ISL or downlink to a downlink cell that subsequently becomes available.

In further view of such potential timing errors, according to other example embodiments, late arrival may be mitigated by different procedures. According to one such embodiment for mitigating late packet arrival, as in the case of an early packet arrival, data packets that arrive at a given node late may also be dropped by that node. Here also, the solution of dropping the packets, however, may adversely affect packet loss rate objectives/requirements to the point where such objectives/requirements are no longer met. According to a further embodiment for mitigating late packet arrival, data packets arriving at a given network node late may be serviced via make-before-break process, where two satellites illuminate the same beam without interference (which may be accomplished, for example, by splitting the band). According to yet a further embodiment for mitigating late packet arrival, here again, the system may be configured to reroute any late arriving data packets via any of the methods described above for rerouting early packets.

With regard to the uplink burst planning and the route planning for the overall system, in accordance with example embodiments, the radio resource management (RRM) function and route planning may be centrally deployed at a network operations center or central network management site of the system. Alternatively, the RRM and route planning function may be distributed as a cloud computing system or distributed amongst various sites of the overall system. As would be appreciated, various factors impact or influence the actual implementation of this central processing function, such as scalability, backup options, geographic resources, the distribution of different business centers involved in the overall network operations, etc. irrespective of the actual implementation, however, by way of example, taking into account the overall configuration of all of the required circuits for the network, along with the various system factors that would impact the actual route for each respective circuit at each given point in time, the RRM route planning function generates the respective route table for each such circuit over the overall applicable time period during which the circuit must be operational. By way of further example, the series of routes for a particular circuit may be cyclical in time, for example, based on the cyclical nature of the orbits of the various satellites within the constellation, and specifically the satellites that may be involved in the routes between the two UNI endpoints of the circuit—as such, a series of routes in a route table for a given circuit may simply cycle throughout the overall time period for the circuit.

Figure 5:
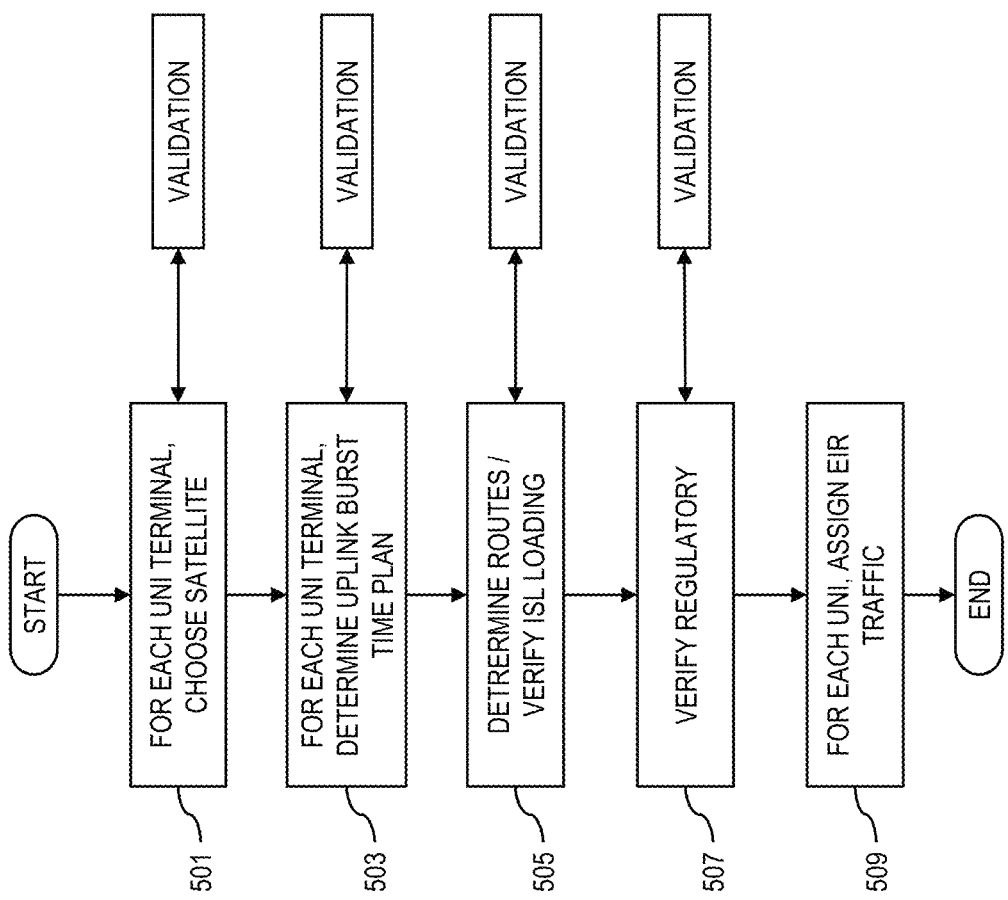
FIG. 5 depicts an overview flow chart of an example algorithm by which the RRM function may determine the respective uplink burst plan and route tables for each UNI terminal, in accordance with example embodiments of the present invention.
Figure 6A:
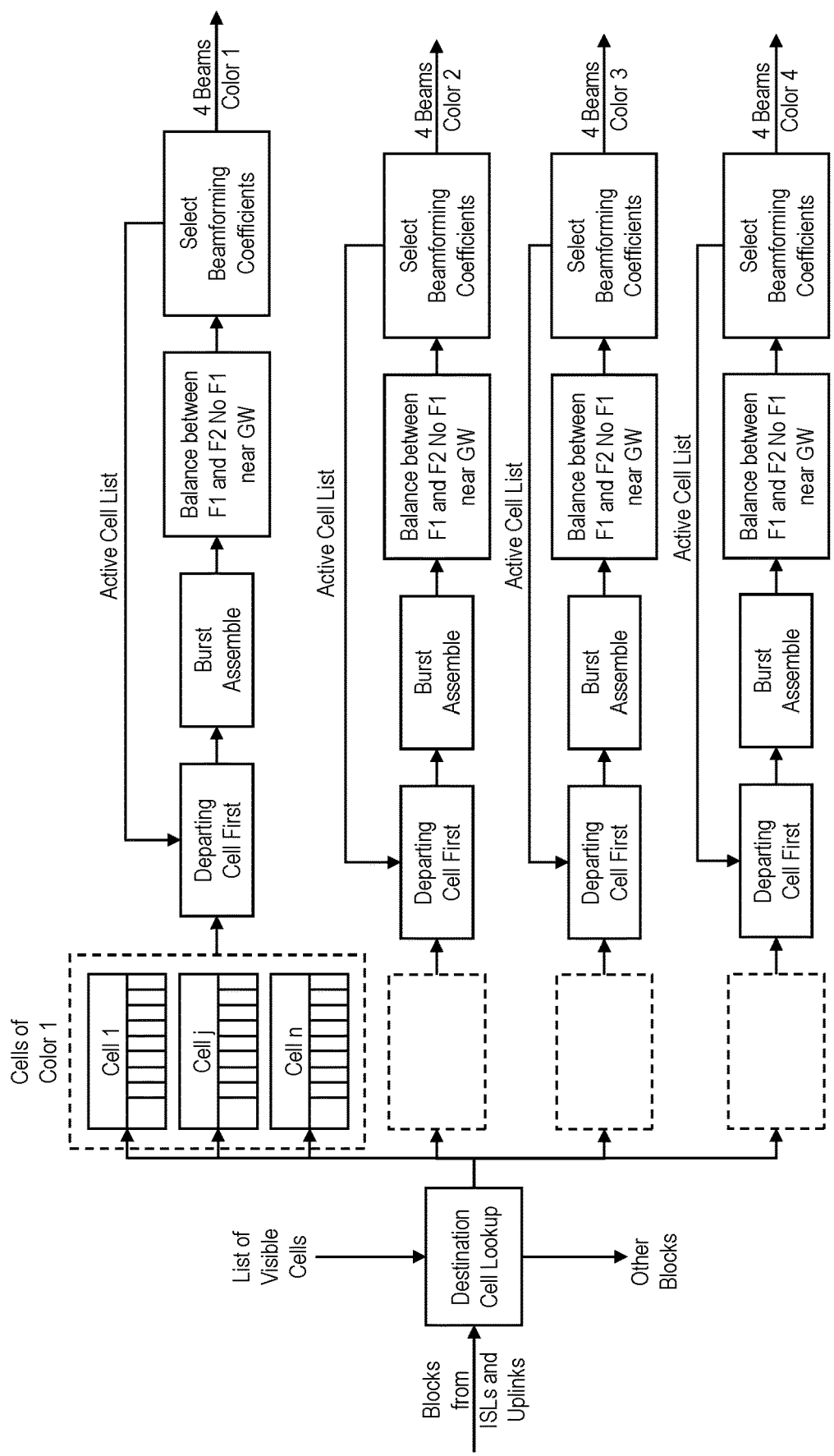
FIGS. 6A-6E depict diagrams illustrating different downlink queueing approaches for the downlink of data packets to the destination UNI terminal, in accordance with example embodiments of the present invention.
Figure 6B:
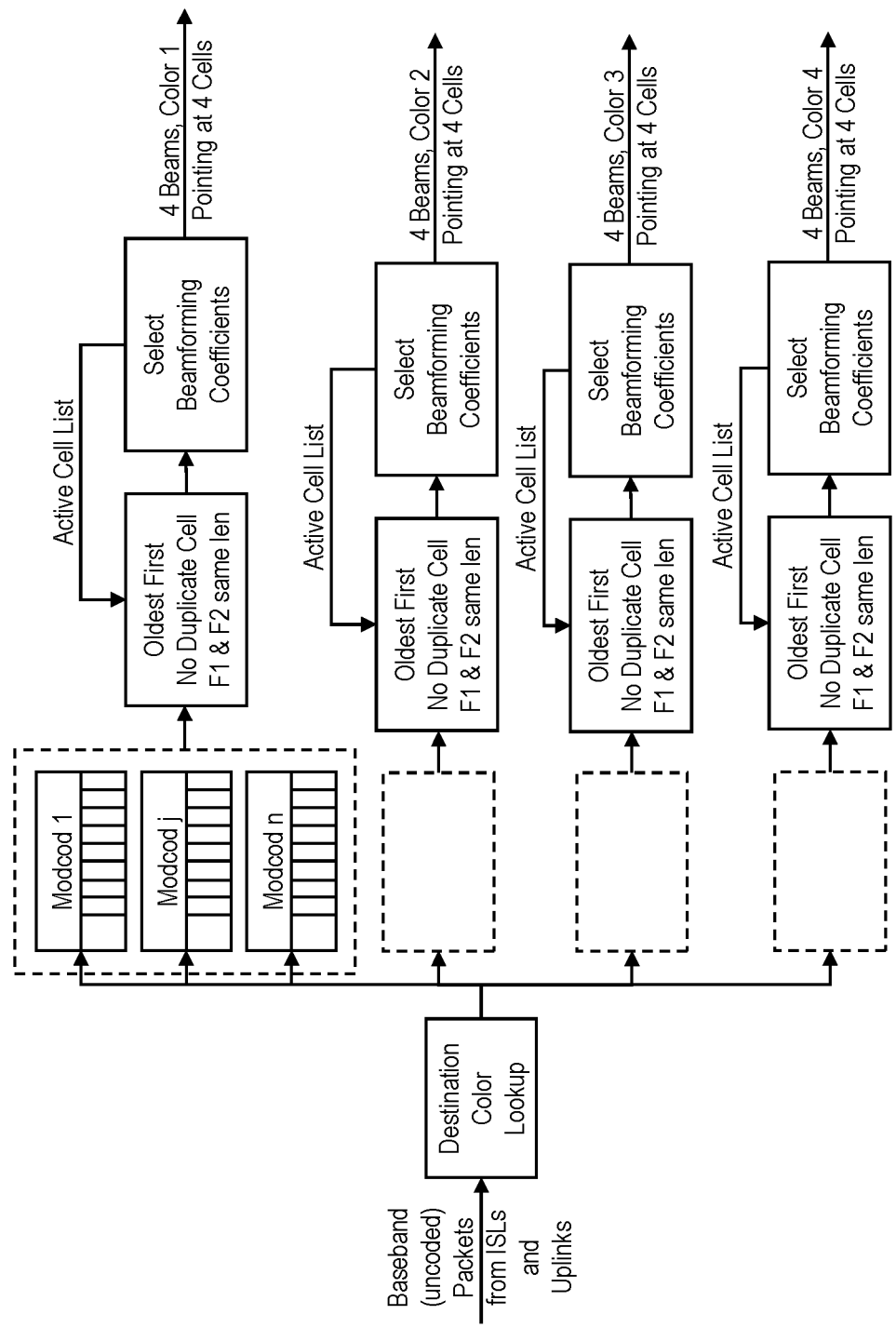
Figure 6C:
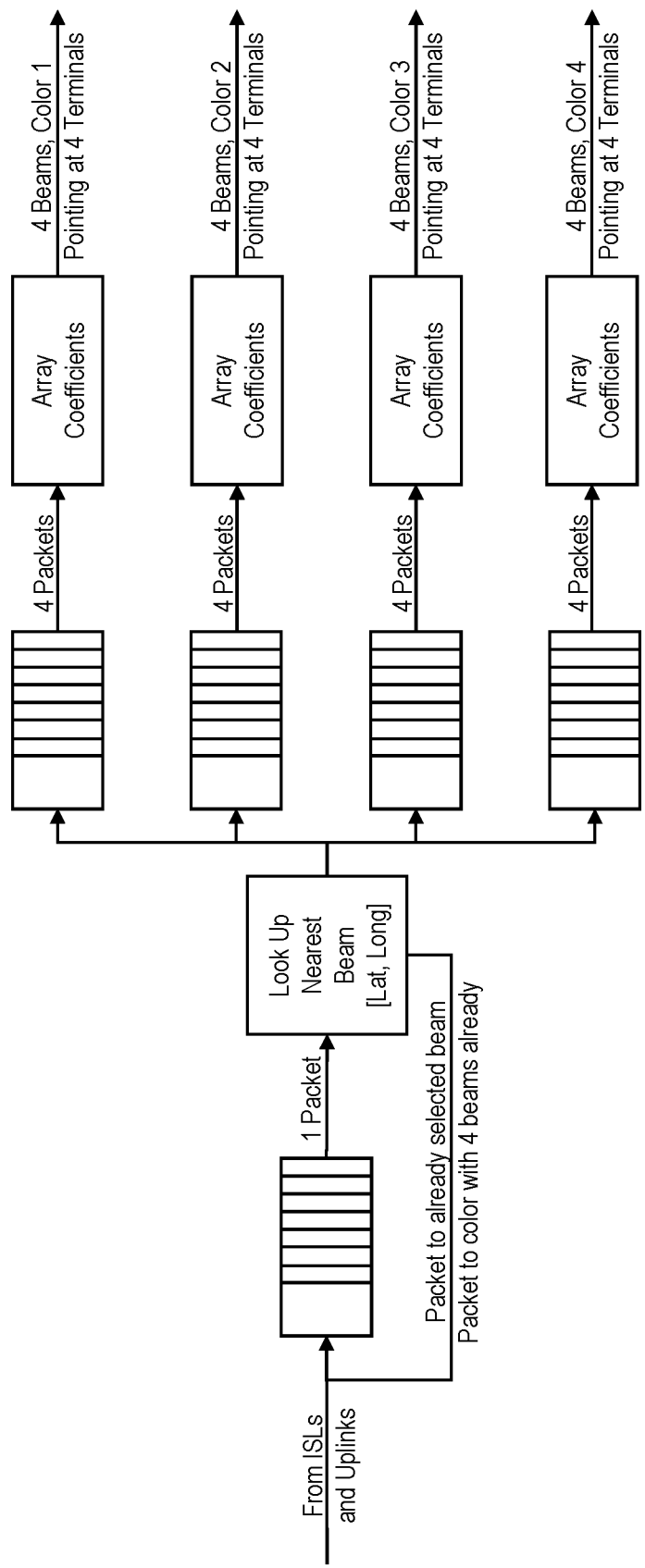
Figure 6D:
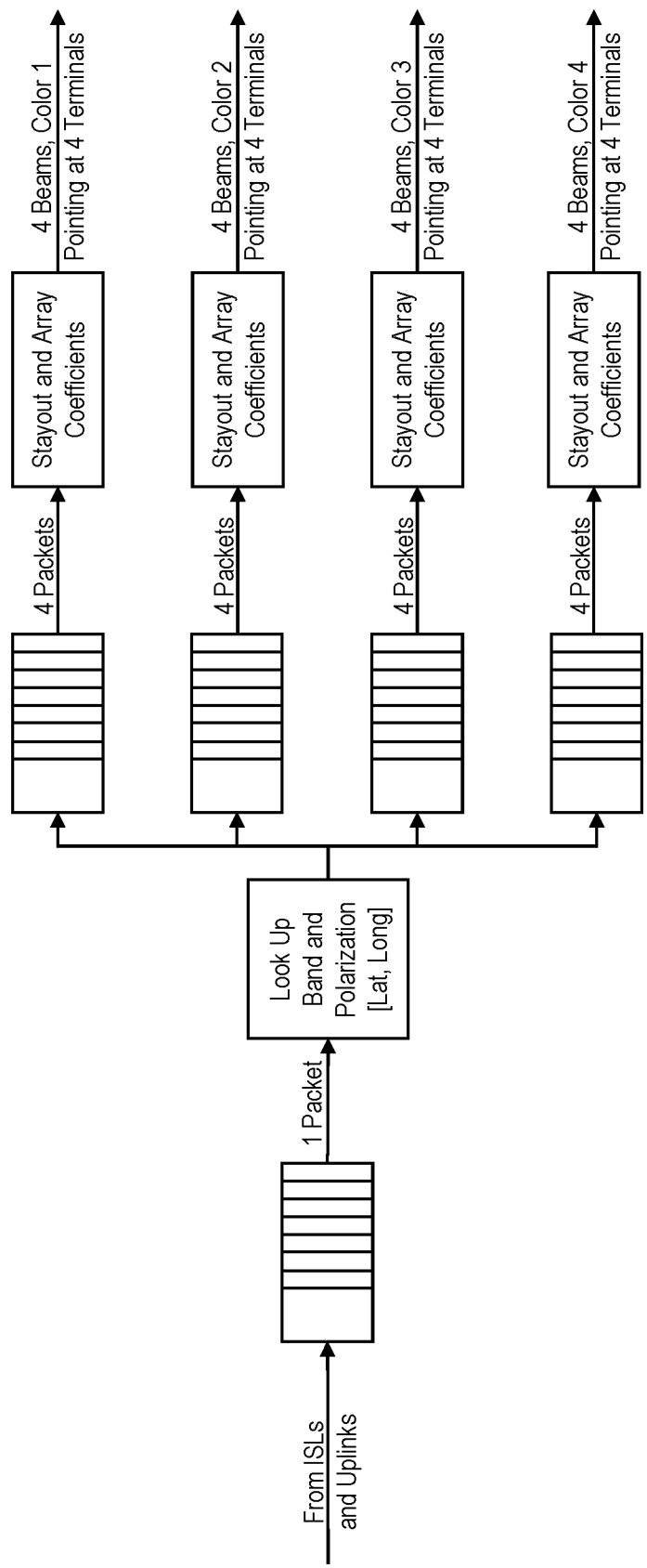
Figure 6E:
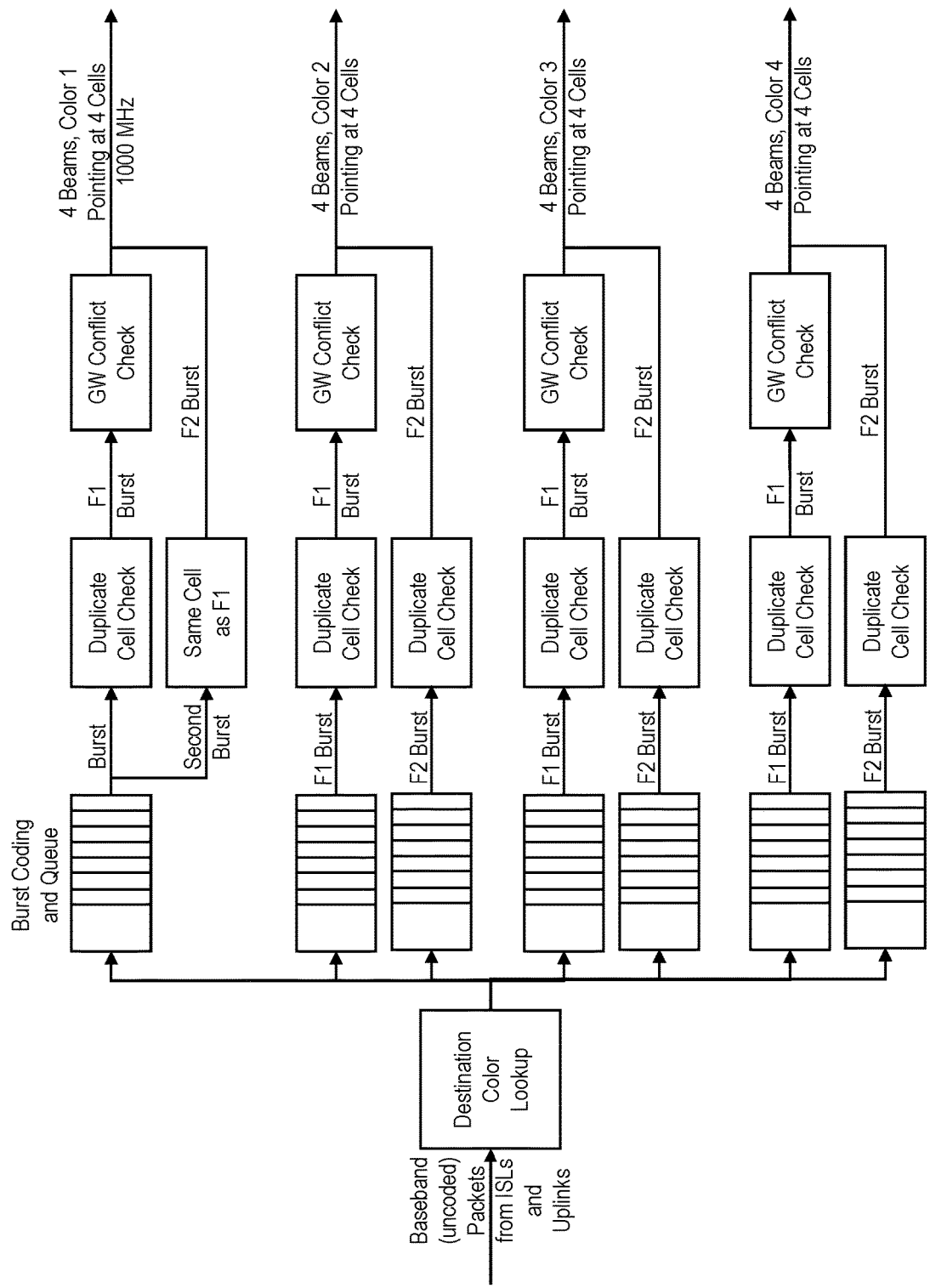

FIG. 5 depicts an overview flow chart of an example algorithm by which the RRM function may determine the respective uplink burst plan and route tables for each UNI (serving both as an ingress point for uplink of data packets for transmission over the respective circuits serviced by the UNI, and as in egress point for downlink of data packets received from the respective circuits serviced by the UNI), in accordance with example embodiments of the present invention. According to the algorithm, the RRM function performs the process on a per UNI terminal basis, and with regard to each terminal, the process is performed for individual time intervals, where a particular route applies for only a respective time interval—e.g., 1 second. Further, FIG. 5 depicts a validation function for each algorithm step—whereby, for each step loading, regulatory and other factors are verified with respect to the determinations made as part of the operation of the step, and when any particular validation fails, adjustments are made to alleviate the validation failure—for example, a terminal can be moved to a different satellite for certain respective time intervals (where the terminal being moved may be the terminal of a current route being determined, of may be a terminal of a previously determined route), an alternate may be chosen for an intermediate hop in a circuit route for certain respective time intervals, etc.

At Step 501, for each UNI terminal, the RRM function chooses a first satellite as a tentative selection of the satellite to which the terminal will be assigned for a respective time interval. By way of example, the satellite choice may be based on the terminal location and the satellite ephemeris (e.g., selecting the nearest available satellite). Then, the RRM function performs a validation test considering for example, if a blockage exists (e.g., trees, buildings, etc.), if the satellite power budget does not support operation during the respective time interval, or if the equivalent power flux density (EPFD) from that satellite for its beam illuminating the respective UNI terminal exceeds a total EPFD limitation. If any validation fails, the RRM function may be required to choose an alternative satellite as the tentative selection of the satellite for the respective time interval. If the validation passes, then the selected satellite is tentatively set as the satellite to which the terminal will be associated for the respective time interval.

Once the a tentative satellite selection is made for each UNI terminal, at Step 503, for each UNI terminal, the RRM function then determines an uplink burst time plan. By way of example, as part of the determination of the uplink burst plan, the RRM function must determine respective loading relative to the terminal and the satellite to ensure that each node will be capable of handling the overall load being assigned to it during each respective time interval. One factor relevant to this loading determination is the ingress and egress load of the terminal. The determination of the ingress and egress load for a given UNI terminal will initially be based on the total committed information rate (CIR) that the terminal is committed to provide for all circuits being serviced by the terminal during the respective time interval. Further, the determination of the ingress and egress load for the UNI terminal may also be based on real-time load reporting from the terminal and the respective satellite (e.g., the terminal can be configured to periodically report uplink traffic levels and queue status to the network manager or RRM function, and the respective satellite can report queue status or maximum wait time, or other congestion metrics for input to the uplink burst time planning). Further, as part of the determination of the ingress and egress load for the terminal, the RRM function estimates an anticipated modulation and coding (modcod) scheme that it estimates the terminal will be employing for the ingress and egress during the respective time interval—for example, according to propagation loss, power control and weather. This may be necessary because, based on the choice of satellite for the given time interval, the bandwidth of the respective link will depend on the modcod scheme that the terminal is able to employ in view of the link conditions with that satellite. Further, the RRM function may also account for the route headers added to the data packets and protocol overhead in the determination of the ingress and egress load.

By way of further example, another factor relevant to the loading determination is the total load of each tentatively chosen satellite for each respective time interval (e.g., considering the number of terminals communicating with the satellite from within that satellite beam (including gateways), and also the loads of the satellite ISL links, for the respective time interval). Accordingly, for each satellite, the RRM function determines its overall loading, which may be accomplished by summing the load over all ingress traffic into the satellite for each respective time interval. Further, to ensure that any given satellite link isn't overloaded, the RRM function may separately sum the load over all egress traffic to the terminals being serviced by the satellite downlink during each respective time interval, and may also separately sum the ingress/egress load over each ISL during each respective time interval and separately sum the ingress/egress load for all gateways associate with the satellite during each respective time interval.

Once all such loading determinations are validated as being operable (on the foregoing per-UNI terminal and per-satellite bases), the RRM function then sets the tentative satellite assignments as permanent assignments for association of the respective terminals with that satellite for each respective time interval, and for determination of the uplink burst time plan for each UNI terminal. However, if the total determined load is above a predetermined threshold, then one of several alternative options may be chosen—(i) the traffic may not be admitted, (ii) if during the one second interval, a second satellite could illuminate the (ingress or egress) cell of a terminal, that terminal may be moved to the second satellite (or all the terminals in the cell should move to the second satellite), (iii) move a cell that was going to switch to another satellite soon anyway, (iv) the situation can be marked as an issue and the moves can be performed in a second iteration.

For each satellite, the RRM function then creates an uplink burst time plan for each UNI terminal that governs or sets the uplink burst times during which each such terminal will uplink the data packets of the respective circuits that the terminal is servicing. By way of example, the uplink time plan is determined such that each terminal is addressed long enough to satisfy the respective service level requirements for the circuits serviced by the terminal. Further, other factors may be considered in the determination of the uplink time plan, such as ground segment constraints (such as EIRP and G/T, tracking speed, make before break, etc.), the burst time plan should not significantly change from the terminal perspective (only the satellite receiving the uplink bursts will change), uplink timing changes to accommodate the different slant paths for different satellites.

At this point, for each respective time interval, each UNI is assigned to a particular satellite and is assigned a respective burst time plan for uplink of the data packet for each circuit being serviced by the terminal.

At Step 505, for each UNI terminal (in its capacity as the ingress point or source terminal for the circuits being serviced by the terminal), for each circuit, during each respective time interval for the circuit, the RRM function determines the satellite-to-satellite ISL hops from the source UNI terminal to the destination UNI terminal, and builds the route table for the UNI terminal. As part of the route determinations, the RRM function verifies the respective inter-satellite link (ISL) loading. By way of example, with regard to ISL loading, the RRM function may verify that the respective ISLs have enough bandwidth to carry the traffic to the respective destinations. According to an alternate example with regard to ISL loading, if provided, inter-constellation ISLs would be subject to interruption, where RRM planning would incorporate such interruptions into the routes. By way of further example, appropriately placed GWs could serve as pseudo-ISLs and route traffic when ISLs are overloaded, which could be part of RRM planning or employed on an ad hoc basis. As described above, the route table for each UNI provides a series of routes for each circuit serviced by the UNI, broken down by time intervals, where each route provides an end-to-end connection of links for the transmission of data packets over the circuit (from the source/ingress UNI, through certain ISLs between respective satellites of the constellation, to the destination/egress UNI) that is valid for the respective time interval. Thereby, for each data packet received by the UNI, the route table provides the respective circuit route for the data packet for the time interval during which the packet will be transmitted by the UNI. Further, the burst time plan provides the specific uplink bursts assigned to the UNI for uplink of the data packets of all circuits serviced by the UNI.

At Step 507, the RRM function verifies that all applicable regulatory requirements are met. By way of example, with regard to regulatory verification, after all burst time plans have been determined, the RRM function may determine the EPFD for every hop, and based on the determined EPFDs, adjustments can be made to correct any violations. For example, changes can be made to the uplink burst time plan first without moving any terminals to different satellites, which might be done by conservatively assuming that all satellites use the same frequency and are on at the same time. Also, in the case of an EPFD violation, a less conservative calculation can be considered or a change can be implemented to the nearest usable satellite. Further, considering that EPFD is a combination of all satellites, this may need to be done many times.

Further, at Step 509, for each UNI terminal, the RRM function considers assignment of excess information rate traffic (EIR) traffic. At this point, based on the the determination of the ingress and egress load for the UNI terminal, additional traffic requirements may be assigned to a terminal to meet excess bandwidth requirements (e.g., bandwidth on demand, or excess information rate traffic) of a customer/subscriber.

According to example embodiments, FIGS. 6A-6E depict diagrams illustrating different downlink queueing approaches for the downlink of data packets to the destination UNI terminal, in accordance with example embodiments of the present invention.

According to further embodiments, alternative examples for downlink hopping are provided. By way of example, even with stationary cells of a fixed cell size and reuse plan, the side-lobe patterns will vary slightly as the satellite forming the beam moves within its constellation. In this context, controlled interference would be based on the specific details of the satellite phased array antennas, and changing side-lobe patterns will change interference levels. Such may be dealt with based on system planning, or may be dealt with in real-time by the RRM. Further, the terminal could have two antennas for a make before break, with consideration of how the make-before-break affects queueing. A more sophisticated queue service discipline may prioritize the cells that are leaving the satellite field of view (FOV).

According to further example embodiments, the algorithm may be executed at a time interval other than one second, based on the rate at which the plan may change, and granularity with respect to the validity of routes. Further, another variable parameter would be how far in advance the time plan would be determined, where, for example, the further in advance, the less that weather can be accounted for and the more storage would be required at the terminal, and, the less in advance, the harder to distribute and manage, but more responsive to traffic and weather.

According to further example embodiments, satellite diversity may be employed to avoid weather and/or terminal blockages, to provide an alternative satellite with less rain on the slant path and the satellite can illuminate a cell without interference. Such satellite diversity, however, requires knowledge of atmospheric conditions and some moderately quick ability to reconfigure routes. Further, an alternative satellite with unobstructed line of sight could provide for a substitute, which could be determined one time at terminal install, but changing satellites for one terminal may require others to move.

According to further example embodiments, dynamic overlay may be created at a central site, or, if quicker changes are needed, among distributed processing sites throughout the network, which could be on the satellite steerable antennas or the phased array.

According to further example embodiments, with regard to handling of dynamic uplink traffic, ability to accommodate UNI add/modify/delete, changes to service level requirements, new customers, time of day load variation, etc. would be implemented. Further, if excess hops are available, they could be distributed among terminal community to preempt demand, which should not create interference or EPFD violations. Additionally, a processor (e.g., either central or distributed) may be employed to use traffic information to more optimally assign excess hops. For example, traditional Bandwidth on Demand requests may be received and processed centrally, at nearby GWs, or on board the satellite. If the calculations could be done quickly enough, the system could respond to real-time requests, and collect and use queue status from the terminals.

According to further example embodiments, congestion management may be employed. Only ingress traffic flow can be controlled at the UNI, but one or more egress ports may exceed the downlink capability. In that context, congestion management data may be collected in a number of different manners. By way of example, color queues can contain data (which, however, may not be in the best format), or maximum queue wait times or queue depth may be used, or explicit congestion notifications may be employed, or the egress terminal could report back delays or out of order packets. Further, central or local GW processor collects, refines and summarizes distributes information as needed, such as, at least to all the terminals that talk to this cell, and maybe to all the terminals in system. Further, ingress terminals may exercise source flow control accordingly.

According to further example embodiments, cell layouts may be changed, as appropriate. By way of example, cell sizes could be chosen at start of operation and not changed over life, which might mean reduced performance when beams are formed by a satellite at maximum distance, which may be acceptable at beginning of life. Further, cell sizes could be smaller in northern latitudes due to closer satellite spacing, where non-uniform, but fixed, beam size would have some impact on interference, which might be a reasonable trade. Further, reuse pattern probably need not be purely 4-color in the final system. Frequencies must comply with regulatory constraints, and the ultimate plan should be optimized based on system traffic models. For example, if the bulk of the traffic is star, the gateways may use a disproportionate amount of hops on a particular color, thereby starving a terminal.

According to further example embodiments, with regard to plan distribution, the next hop could be as little as 3-bits. For example, (i) two forwarding ISLs, which may require a test that the transmit ISL is going to the intended satellite if the ISL switches between satellites, (ii) stay on egress satellite and forward to burst assembler, (iii) go to on-board processor, (iv) burst time plan could be fairly constant at the terminal, (v) current distribution mechanisms may be employed.

According to further example embodiments, route and address tables (i) may be structured second by second or by duration of route, (ii) may include alternative routes for packets arriving near early/late gates, (iii) terminal addresses may or may not be made hierarchical, as cell sizes or shapes may change during life of the system.

Figure 7:
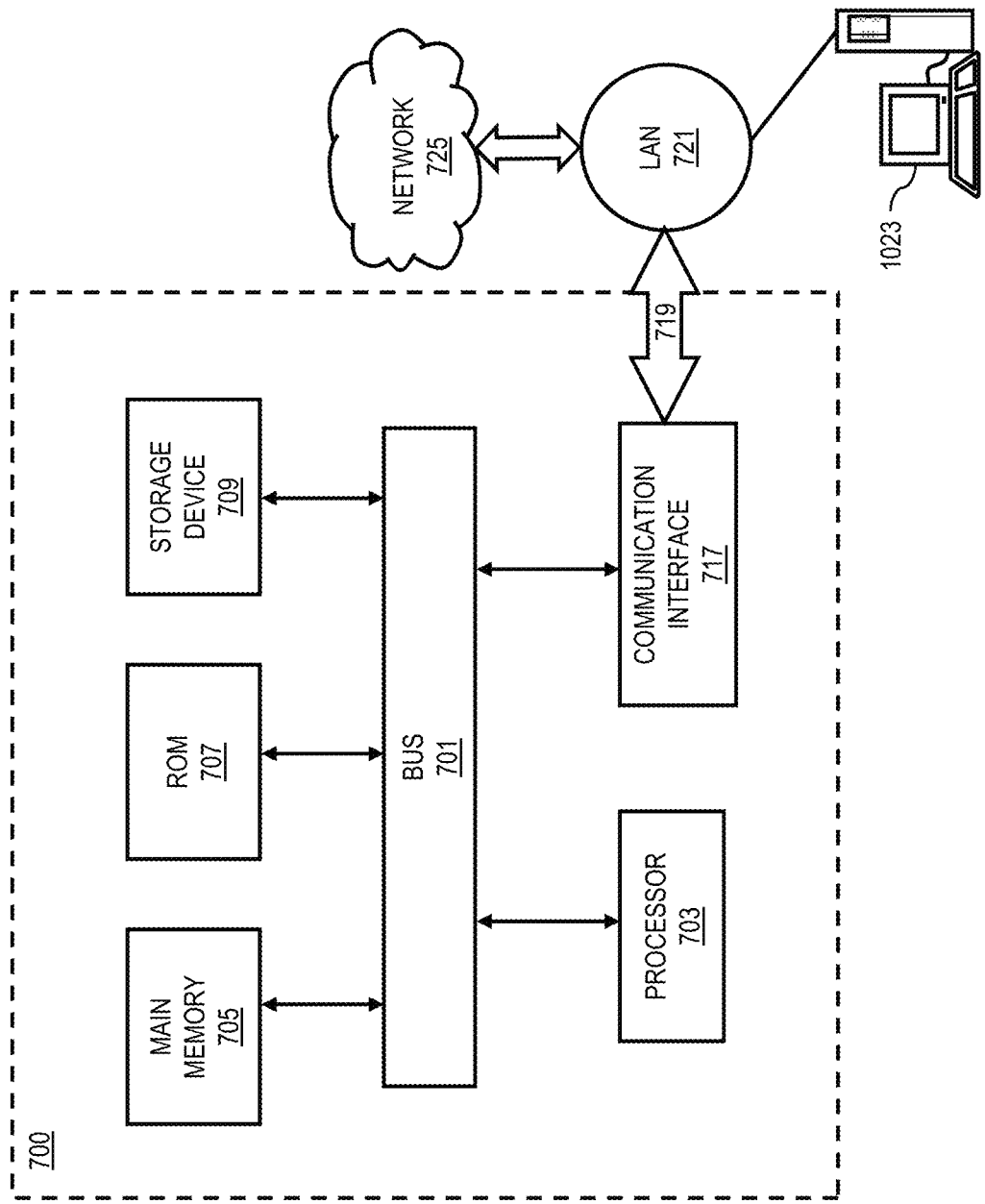
FIG. 7 illustrates a computer system upon which example embodiments according to the present invention can be implemented.

FIG. 7 illustrates a computer system upon which example embodiments according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

According to one embodiment of the invention, approaches in accordance with example embodiments are provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry is used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717, for example, includes peripheral interface devices, such as a Universal Serial Bus (USB) interface, a PCMCIA (Personal Computer Memory Card International Association) interface, etc.

The network link 719 typically provides data communication through one or more networks to other data devices. For example, the network link 719 provides a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are example forms of carrier waves bearing the information and instructions.

The computer system 700 sends messages and receives data, including program code, through the network(s), network link 719, and communication interface 717. In the Internet example, a server (not shown) might transmit requested code belonging to an application program for implementing an embodiment of the present invention through the network 1025, local network 721 and communication interface 717. The processor 703 executes the transmitted code while being received and/or store the code in storage device 709, or other non-volatile storage for later execution. In this manner, computer system 700 obtains application code in the form of a carrier wave.

The term "computer-readable medium" as used herein refers to any medium that participates in providing instructions to the processor 703 for execution. Such a medium may take many forms, including but not limited to non-volatile media, and volatile media. Non-volatile media include, for example, optical or magnetic disks, such as storage device 709. Volatile media may include dynamic memory, such as main memory 705. Common forms of computer-readable media include, for example, a floppy disk, a flexible disk, hard disk, magnetic tape, any other magnetic medium, a CD ROM, CDRW, DVD, any other optical medium, RAM, PROM, and EPROM, FLASH EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for configuring a data communications circuit between a first ground terminal and a second ground terminal via a satellite communications network that includes a plurality of satellites each traveling in a respective non-geostationary orbit around the Earth, the method comprising:

determining a time period during which the data communications circuit between the first ground terminal and the second ground terminal is to be active;

dividing the time period during which the data communications circuit is to be active into a plurality of time intervals; and configuring the data communications circuit for data transmissions from the first ground terminal to the second ground terminal as a plurality of routes, wherein each route is configured as one or more links operable to complete the circuit from the first ground terminal to the second ground terminal during a respective one of the plurality of time intervals;

wherein the determination of each of the plurality of routes comprises (i) selecting a first satellite of the plurality of satellites that is available to service the first ground terminal as an uplink ingress node for the circuit during the respective time interval, and (ii) determining one or more successive inter-satellite links operable to connect the first satellite to a second satellite of the plurality of satellites that is available to service the second ground terminal as a downlink egress node for the circuit during the respective time interval; and wherein the plurality of time intervals are of an equal duration which is based on a time of operability of a one of the inter-satellite links or a time of availability of the first or second satellite, for all of the plurality of routes, which is of the shortest duration.

2. The method according to claim 1, further comprising:

configuring the plurality of routes for the data communications circuit as a list of routes in a route table with each route specifying the first ground terminal as the source terminal, the first satellite as the uplink ingress node, a next hop satellite for each successive intersatellite link, the second ground terminal as the destination terminal, and the respective time interval for the route; and storing the route table so as to be accessible by the first ground terminal for servicing the data transmissions over the data communications circuit from the first ground terminal to the second ground terminal.

3. The method according to claim 1, wherein the data communications circuit supports a committed bit rate, the method further comprising:
   determining an uplink burst plan that allocates to the first ground terminal one or more uplink bursts for transmission of data to the respective satellite selected as the uplink ingress node for each time interval, wherein the uplink burst plan is configured to service the data transmissions over the data communications circuit at the committed bit rate; and
   providing the uplink burst plan to the first ground terminal.

4. The method according to claim 1, wherein the method is for configuring a plurality of data communications circuits, each between the first ground terminal and a respective other ground terminal via the satellite communications network, and wherein:
   for each data communications circuit, a respective time period is determined for which the data communications circuit between the first ground terminal and the respective other ground terminal is to be active, and each such time period is divided into a plurality of time intervals;
   each data communications circuit is configured for data transmissions from the first ground terminal to the respective other ground terminal as a plurality of routes, each configured as one or more links operable to complete the circuit from the first ground terminal to the respective other ground terminal during a respective one of the plurality of time intervals; and
   the determination of each of the plurality of routes, for each data communications circuit, comprises (i) selecting a first satellite of the plurality of satellites that is available to service the first ground terminal as an uplink ingress node for the circuit during the respective time interval, and (ii) determining one or more successive inter-satellite links operable to connect the first satellite to a respective other satellite of the plurality of satellites that is available to service the respective other ground terminal as a downlink egress node for the circuit during the respective time interval.

5. The method according to claim 4, wherein each data communications circuit supports a respective committed bit rate, the method further comprising:
   determining an uplink burst plan that allocates to the first ground terminal uplink bursts for each of the data communications circuits, wherein the uplink bursts for each data communications circuit comprise one or more uplink bursts for transmission of data to the respective first satellite selected as the uplink ingress node for each respective time interval, and are configured for servicing the data transmissions over the respective data communications circuit at the respective committed bit rate; and
   providing the uplink burst plan to the first ground terminal.

6. The method according to claim 5, wherein the first ground terminal services a plurality of subscriber devices and each subscriber device interfaces with the first ground terminal for transmission of data packets via one or more of the plurality of data communications circuits, the method further comprising:
   receiving, by the first ground terminal, respective data packets from each of the end subscriber devices, wherein each data packet is destined for transmission via a respective one of the data communications circuits to the respective other ground terminal;
   determining, for each received data packet, the respective data communications circuit via which the packet is to be transmitted;
   forwarding each data packet to a respective transmission queue allocated for the respective data communications circuit via which the packet is to be transmitted;
   de-queueing the data packets from each of the transmission queues in an order based on the uplink burst plan; and
   transmitting each dequeued data packet to the first satellite via one or more uplink bursts allocated for the respective data communications circuit.

7. The method according to claim 6, wherein:
   one or more of the data communications circuits is allocated a plurality of queues each designated for a different data priority level within the respective data communications circuit;
   for each data packet to be transmitted via a one of the data communications circuits for which the plurality of queues is allocated, the method further comprises determining a respective data priority level of the data packet, and forwarding the data packet to the queue allocated for the respective data communications service that is designated for the respective data priority level of the data packet; and
   for each data communications circuit for which the plurality of queues is allocated, the data packets are dequeued from the queues based on the respective data priority levels.

8. An apparatus for configuring a data communications circuit between a first ground terminal and a second ground terminal via a satellite communications network that includes a plurality of satellites each traveling in a respective non-geostationary orbit around the Earth, the apparatus comprising:
   one or more processors configured to (i) determine a time period during which the data communications circuit between the first ground terminal and the second ground terminal is to be active, (ii) divide the time period during which the data communications circuit is to be active into a plurality of time intervals, and (iii) configure the data communications circuit for data transmissions from the first ground terminal to the second ground terminal as a plurality of routes, wherein each route is configured as one or more links operable to complete the circuit from the first ground terminal to the second ground terminal during a respective one of the plurality of time intervals; and
   wherein the determination of each of the plurality of routes comprises (i) selecting a first satellite of the plurality of satellites that is available to service the first ground terminal as an uplink ingress node for the circuit during the respective time interval, and (ii) determining one or more successive inter-satellite links operable to connect the first satellite to a second satellite of the plurality of satellites that is available to service the second ground terminal as a downlink egress node for the circuit during the respective time interval; and
   wherein the plurality of time intervals are of an equal duration which is based on a time of operability of a one of the inter-satellite links or a time of availability of the first or second satellite, for all of the plurality of routes, which is of the shortest duration.

9. The apparatus according to claim 8, wherein the one or more processors is/are further configured to:

configure the plurality of routes for the data communications circuit as a list of routes in a route table with each route specifying the first ground terminal as the source terminal, the first satellite as the uplink ingress node, a next hop satellite for each successive intersatellite link, the second ground terminal as the destination terminal, and the respective time interval for the route; and control the apparatus to provide the route table to the first ground terminal for servicing the data transmissions over the data communications circuit from the first ground terminal to the second ground terminal.

10. The apparatus according to claim 8, wherein the data communications circuit supports a committed bit rate, and the one or more processors is/are further configured to:

determine an uplink burst plan that allocates to the first ground terminal one or more uplink bursts for transmission of data to the respective satellite selected as the uplink ingress node for each time interval, wherein the uplink burst plan is configured to service the data transmissions over the data communications circuit at the committed bit rate; and control the apparatus to provide the uplink burst plan to the first ground terminal.

11. The apparatus according to claim 8, wherein the apparatus is for configuring a plurality of data communications circuits, each between the first ground terminal and a respective other ground terminal via the satellite communications network, and wherein:

for each data communications circuit, a respective time period is determined for which the data communications circuit between the first ground terminal and the respective other ground terminal is to be active, and each such time period is divided into a plurality of time intervals;

each data communications circuit is configured for data transmissions from the first ground terminal to the respective other ground terminal as a plurality of routes, each configured as one or more links operable to complete the circuit from the first ground terminal to the respective other ground terminal during a respective one of the plurality of time intervals; and the determination of each of the plurality of routes, for each data communications circuit, comprises (i) selecting a first satellite of the plurality of satellites that is available to service the first ground terminal as an uplink ingress node for the circuit during the respective time interval, and (ii) determining one or more successive inter-satellite links operable to connect the first satellite to a respective other satellite of the plurality of satellites that is available to service the respective other ground terminal as a downlink egress node for the circuit during the respective time interval.

12. The apparatus according to claim 11, wherein each data communications circuit supports a respective committed bit rate, and the one or more processors is/are further configured to:

determine an uplink burst plan that allocates to the first ground terminal uplink bursts for each of the data communications circuits, wherein the uplink bursts for each data communications circuit comprise one or more uplink bursts for transmission of data to the respective first satellite selected as the uplink ingress node for each respective time interval, and are configured for servicing the data transmissions over the respective data communications circuit at the respective committed bit rate; and control the apparatus to provide the uplink burst plan to the first ground terminal.

13. A system comprising:

a plurality of ground terminals;

a plurality of satellites, each traveling in a respective non-geostationary orbit around the Earth; and a route determination apparatus configured to configure a plurality of data communications circuits, each between a first terminal of the plurality of ground terminals and a respective other terminal of the plurality of ground terminals, the route determination apparatus including one or more processors; and wherein for each data communications circuit, the one or more processors of the route determination apparatus is/are configured to (i) determine a respective time period during which the data communications circuit between the first terminal and the respective other terminal is to be active, (ii) divide each such time period during which the data communications circuit is to be active into a plurality of time intervals, and (iii) configure the data communications circuit for data transmissions from the first terminal to the respective other terminal as a plurality of routes, configured as one or more links operable to complete the circuit from the first terminal to the respective other terminal during a respective one of the plurality of time intervals;

wherein the determination of each of the plurality of routes, for each data communications circuit, comprises (i) selecting a first satellite of the plurality of satellites that is available to service the first terminal as an uplink ingress node for the circuit during the respective time interval, and (ii) determining one or more successive inter-satellite links operable to connect the first satellite to a second satellite of the plurality of satellites that is available to service the respective other terminal as a downlink egress node for the circuit during the respective time interval; and wherein the plurality of time intervals are of an equal duration which is based on a time of operability of a one of the inter-satellite links or a time of availability of the first or second satellite, for all of the plurality of routes, which is of the shortest duration.

14. The system according to claim 13, wherein the one or more processors of the route determination apparatus is/are further configured to:

for each of the data communications circuits, configure the plurality of routes as a list of routes in a route table with each route specifying the first terminal as the source terminal, the first satellite as the uplink ingress node, a next hop satellite for each successive intersatellite link, the respective other terminal as the destination terminal, and the respective time interval for the route; and control the route determination apparatus to provide the route table to the first terminal for servicing the data transmissions over each of the data communications circuit from the first terminal to the respective other terminal.

15. The system according to claim 13, wherein each data communications circuit supports a respective committed bit rate, and the one or more processors of the route determination apparatus is/are further configured to:

determine an uplink burst plan that allocates to the first terminal uplink bursts for each of the data communications circuits, wherein the uplink bursts for each data communications circuit comprise one or more uplink bursts for transmission of data to the respective first satellite selected as the uplink ingress node for each respective time interval, and are configured for servicing the data transmissions over the respective data communications circuit at the respective committed bit rate; and control the route determination apparatus to provide the uplink burst plan to the first terminal.

16. The system according to claim 15, wherein the first terminal services a plurality of subscriber devices and each subscriber device interfaces with the first terminal for transmission of data packets via one or more of the plurality of data communications circuits, and wherein:

an input data packet processor of the first terminal is configured to (i) receive respective data packets from each of the end subscriber devices, wherein each data packet is destined for transmission via a respective one of the data communications circuits to the respective other terminal, (ii) determine, for each received data packet, the respective data communications circuit via which the packet is to be transmitted, and (iii) forward each data packet to a respective transmission queue allocated for the respective data communications circuit via which the packet is to be transmitted;

a transmission data packet processor of the first terminal is configured to de-queue the data packets from each of the transmission queues in an order based on the uplink burst plan, and transmit each dequeued data packet to the first satellite via one or more uplink bursts allocated for the respective data communications circuit.

\* \* \* \* \*